United States Patent [19]
Hill

[11] Patent Number: 5,794,911
[45] Date of Patent: Aug. 18, 1998

[54] ADJUSTABLE VEHICLE SEAT SUSPENSION

[75] Inventor: Kevin E. Hill, Mequon, Wis.

[73] Assignee: Milsco Manufacturing Company, Milwaukee, Wis.

[21] Appl. No.: 597,019

[22] Filed: Feb. 5, 1996

[51] Int. Cl.[6] .................................................. F16M 13/00
[52] U.S. Cl. .......................... 248/588; 248/620; 248/419
[58] Field of Search .................................. 248/588, 584, 248/620, 419, 421, 157

[56] References Cited

U.S. PATENT DOCUMENTS

| | | |
|---|---|---|
| 974,769 | 11/1910 | Hoff . |
| 3,390,857 | 7/1968 | Nyström ............................ 248/399 |
| 3,873,055 | 3/1975 | White ................................ 248/588 |
| 4,148,518 | 4/1979 | Vilbeuf ............................. 248/588 |
| 4,312,491 | 1/1982 | Aondetto .......................... 248/588 |
| 4,350,317 | 9/1982 | Aondetto .......................... 248/588 |
| 4,382,573 | 5/1983 | Aondetto .......................... 248/588 |
| 4,687,250 | 8/1987 | Esche ................................ 297/320 |
| 4,729,539 | 3/1988 | Nagata ............................. 248/588 |
| 4,768,762 | 9/1988 | Lund ................................ 267/172 |
| 4,813,645 | 3/1989 | Iwami .............................. 248/588 |
| 4,880,201 | 11/1989 | Hall et al. ......................... 248/588 |
| 4,890,810 | 1/1990 | Sakamoto ......................... 248/588 |
| 4,926,760 | 5/1990 | Sack ................................. 248/588 |
| 4,941,641 | 7/1990 | Granzow et al. ................. 248/588 |
| 5,058,852 | 10/1991 | Meier et al. ...................... 248/588 |
| 5,222,709 | 6/1993 | Culley, Jr. et al. .............. 248/421 |
| 5,251,864 | 10/1993 | Iton .................................. 248/588 |
| 5,364,060 | 11/1994 | Donovan et al. ................. 248/588 |
| 5,580,027 | 12/1996 | Brodersen ........................ 248/421 |

*Primary Examiner*—Charles A. Marmor
*Assistant Examiner*—Matthew A. Kaness
*Attorney, Agent, or Firm*—Nilles & Nilles SC

[57] ABSTRACT

A suspension for a vehicle seat having a scissors arm linkage with a load carrying flexible member secured to a spring and in operable contact with a cam-shaped pulley carried by the linkage for producing a suspension of compact structure, which enables seat height to be adjusted independently of weight adjustment, and which produces a suspension having desirable load-deflection characteristics. The suspension has a platform for carrying the seat which overlies the linkage and a base underlying the linkage that supports the suspension and permits mounting to the floor of a vehicle. Weight adjustment of the suspension is accomplished by selectively tensioning the springs without changing the distance between the platform and base. Height adjustment of the seat is accomplished by moving the spring and flexible member in unison to controllably collapse or expand the linkage thereby selectively changing the distance between the platform and base. Preferably, the flexible member is a belt that is preferably of endless and substantially inelastic construction.

34 Claims, 10 Drawing Sheets

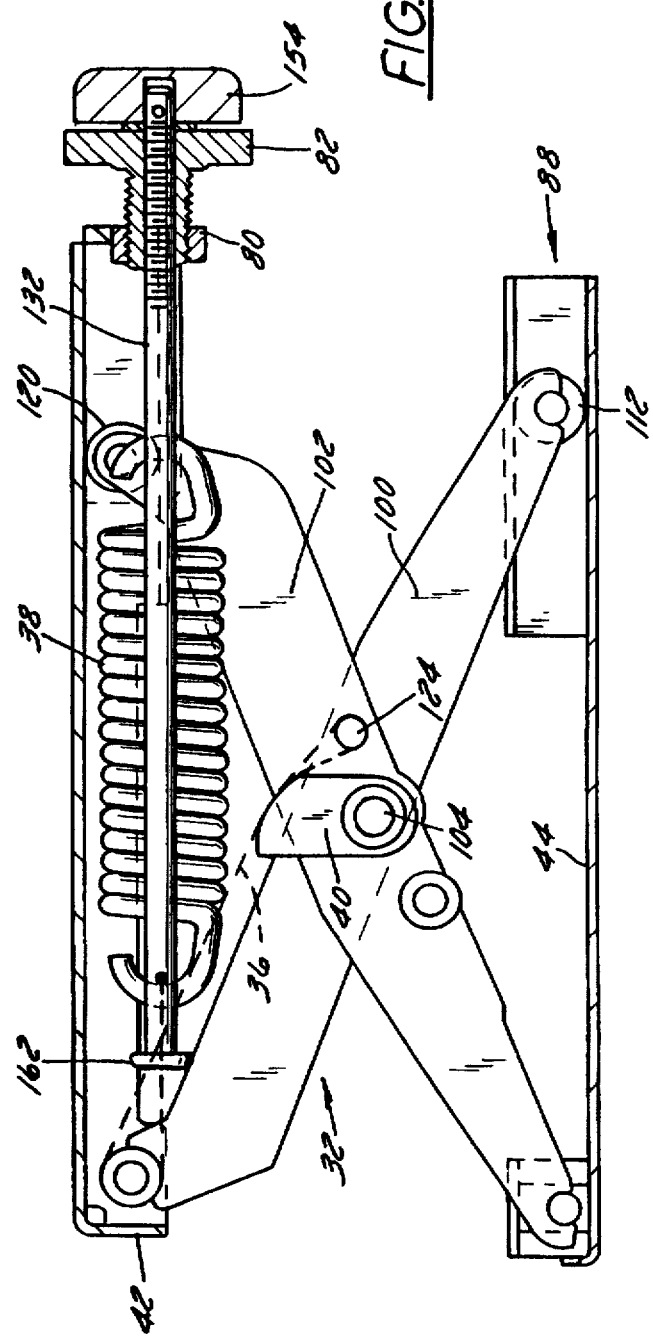
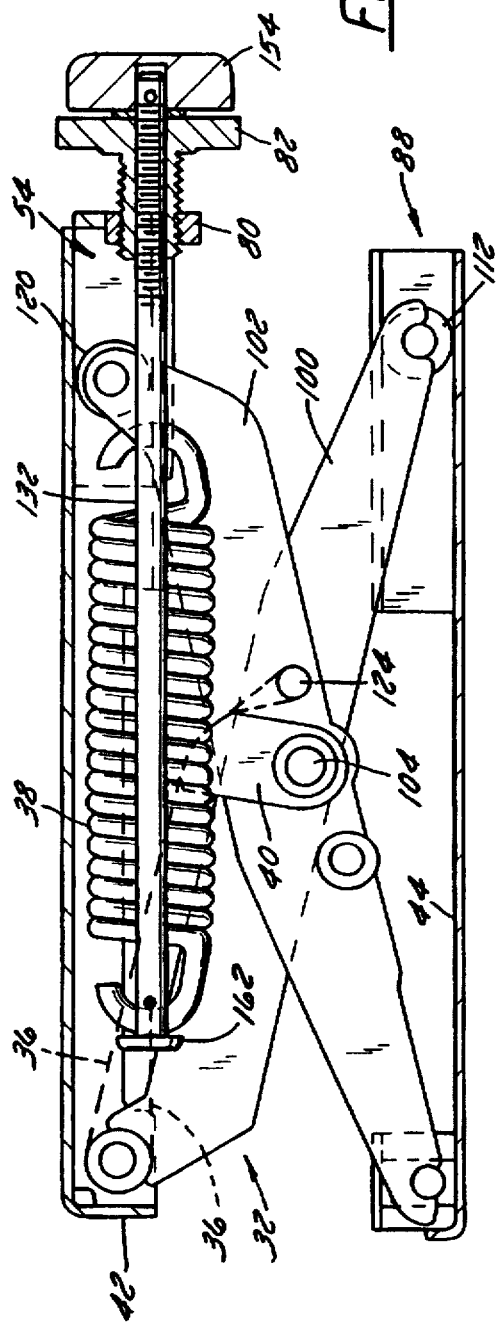
FIG. 8
FIG. 9

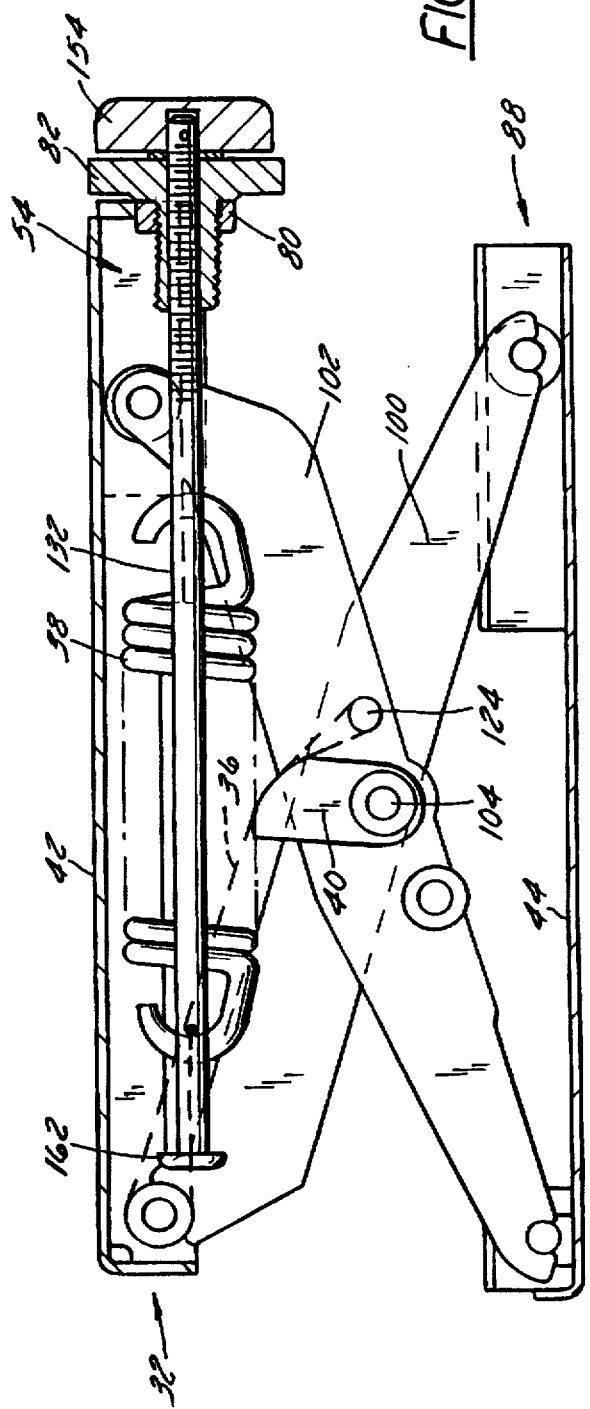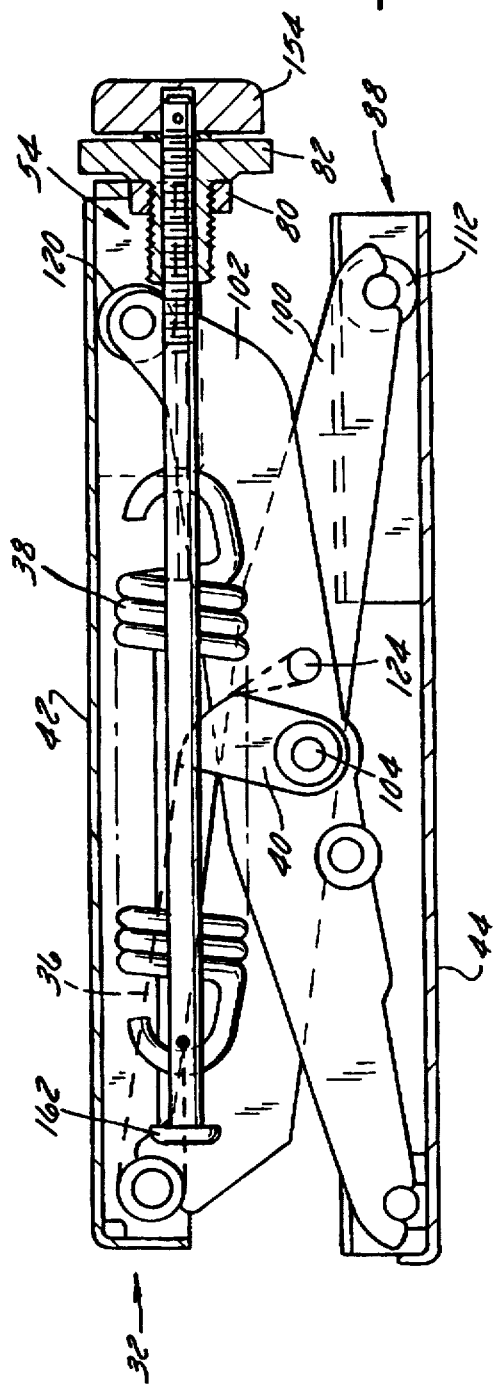

ADJUSTABLE VEHICLE SEAT SUSPENSION

FIELD OF THE INVENTION

This invention relates generally to a suspension for a vehicle seat and more particularly to a vehicle seat suspension utilizing at least are in elastic load supporting flexible member and which enables compensation for the weight of a seat occupant to be independently adjustable of seat height while producing favorable load-deflection characteristics.

BACKGROUND OF THE INVENTION

Suspensions for seating are typically used to support a person sitting in a seat while maximizing their comfort. As such, suspensions for vehicle seating are designed to provide comfort to a seat occupant while minimizing or absorbing and dampening bumps and jolts due to uneven, rough or rugged terrain encountered while riding in a vehicle. In fact, designing suspensions for vehicle seating sometimes requires a designer to consider a number of factors, such as, for example: seat vibration, natural frequency of the seat and suspension, the suspension characteristics of the vehicle, the type of terrain that will be encountered by the vehicle, how far the seat suspension can travel to absorb shocks during operation, vehicle seat size and packaging constraints, how the seat and suspension will behave during a crash, component and suspension cost, reliability and durability, how easy and cost-effectively the suspension can be mass produced on an assembly line, as well as many other factors.

These design criteria apply not only to vehicle seat suspensions for automotive vehicles, such as trucks and automobiles, but also to seat suspensions for off-road vehicle applications, such as tractors, heavy equipment, and the like. In many cases, design considerations for off-road vehicle seating can be more complicated because off-road vehicles often have relatively heavy duty suspensions between their wheels and vehicle chassis which do not always fully prevent shocks, jolts, bumps, and vibration from being transmitted to a seat occupant. As a result, off-road vehicle suspensions often do not adequately absorb shocks and jolts resulting in a rough ride to a seat occupant.

Since an off-road vehicle suspension may not always able to adequately absorb shocks, jolts and vibration, each of the seats of an off-road vehicle must be able to safely dampen and absorb these transmitted bumps, jolts, shocks and vibrations. In fact, each seat must be able to effectively handle these inputs for not only preventing injury to a seat occupant, but also to provide comfort and prevent fatigue. Moreover, because off-road vehicles often can encounter very rough terrain, off-road vehicle seats must also provide stability to the driver of the vehicle when encountering rough terrain to enable the driver to maintain adequate control of the vehicle. As a result, several types of vehicle seats and seat suspensions have been developed which attempt to solve many of these design challenges.

One such commercially successful vehicle suspension design is disclosed in Donovan, et al., U.S. Pat. No. 5,364,060, assigned to the assignee herein. In this suspension design, a seat platform is supported on a base by a scissors arm linkage suspension arrangement. On the platform is a seat for receiving a seat occupant. The scissors arm linkage suspension utilizes springs and a cam and follower assembly to enable the seat platform to carry a load, such as that of a person sitting on the seat, while cushioning the load from the harsh vibration, bumps, jolts and severe shocks, all of which can occur during off-road vehicle operation.

Although the aforementioned vehicle seat suspension design has enjoyed substantial commercial acceptance and success, improvements in other types of off road vehicle seat suspensions nonetheless remain desirable. For example, off road vehicle seat suspensions for use in small tractors and other small off road vehicles require a seat having a suspension which is more compact so it can easily fit in the vehicle. Additionally, for these applications, while cams and cam followers can be reliably used to provide favorable suspension characteristics, they can be a challenge to incorporate into a seat that is sufficiently compact to fit into a vehicle having rather small seating space constraints. Moreover, cam and follower assemblies are expensive and therefore can be difficult to cost effectively incorporate into a vehicle seat of compact design.

In Meier et al., U.S. Pat. No. 5,058,852, a rather elaborate, complicated, and expensive electromechanical suspension arrangement is disclosed. The suspension has a scissors arm linkage arrangement with a gas spring and compressor between the seat platform and base for supporting a load on the seat. Unfortunately, this seat requires a separate electrical power source to operate making it less than desirable for certain off-road vehicle applications which utilize rather small or, in some cases, no alternators and must minimize electrical load. Additionally, as a result of using a relatively large gas spring, the distance the seat platform can travel downwardly toward the spring until it bottoms out against the spring is limited, thereby severely limiting the maximum stroke of the seat suspension. As a result, this seat suspension is not well suited for off-road vehicle applications having limited space for seating.

A seat suspension disclosed in Nyström, U.S. Pat. No. 3,390,857, uses a parallelogram linkage arrangement that is coupled to a pair of spaced apart tension springs for resisting downward movement of the seat toward the base of the suspension. The tension springs are in the form of belts which are received on a rod connected by lever arms to a shaft of the parallelogram linkage arrangement for opposing rotation of the shaft to resist downward movement of the seat. The suspension also has a pair of coil springs coupled at one end to the frame of the suspension and at the other end to a spring mounting bracket of a belt tensioning device to oppose the force exerted on the bracket by the belts and thereby attempt to balance the forces exerted by the belts on the bracket.

In this suspension, the belts are elastic, functioning as springs to resist downward movement of the seat. Unfortunately, this seat and suspension are poorly suited for off-road vehicle applications because its parallelogram linkage arrangement significantly limits the downward travel or stroke of the seat suspension reducing its ability to effectively handle large jolts and bumps. Even if stroke were increased by increasing the length of lever arms of its parallel linkage arrangement, downward travel of the seat disadvantageously follows an arcuate path which either moves a seat occupant away from or toward the vehicle dash as the seat moves downwardly or upwardly.

Hoff, U.S. Pat. No. 974,769, discloses a counterbalanced seat lifting device for assisting a seat occupant in getting up and out of a seat of a conventional chair while cushioning a person from the shock of sitting down in the chair. This is accomplished using a spring and linkage arrangement that is not a scissors arm linkage. To assist in lifting a person from the chair, a pair of spaced apart chains are affixed to what are referred to as depending quadrants that are integral with bearing sleeves carried on a shaft secured to the chair frame. The chains are secured at their opposite end to coil springs. Arms attached to the bearing sleeves are pivotally attached by links to the underside of the seat.

In operation, as a seat occupant rises from a chair equipped with this seat lifting device, the springs and chains cause the sleeve to rotate urging the arms and links upwardly against the seat bottom thereby urging the seat occupant upwardly out of the chair. As the person further rises, the arms further pivot about the sleeve and raise the seat, helping the seat occupant to get out of the seat. The seat pivots upwardly until a stop is reached. The seat then remains in an upraised position until someone sits down in the chair.

Once a person is seated in the chair, the lifting mechanism is not designed to function as a suspension, but rather is designed only to assist a person getting into and out of the chair. Once a person is seated in the chair, the chair rests on a pair of coil springs. Unfortunately, once seated, the seat lifting mechanism and coil springs result in a rudimentary suspension that has a very limited and small stroke, offering virtually no ability to adequately cushion a seat occupant from bumps and shocks encountered while seated, particularly if used in an off road vehicle seating suspension application. Additionally, the seat lifting device and coil springs disclosed in the '769 patent cannot be constructed and arranged to specifically tailor load handling and suspension deflection characteristics to produce seat suspensions having different load-deflection characteristics for different vehicle seating applications and suspension requirements. Moreover, the seat lifting mechanism, without the coil springs, simply cannot even poorly function as a vehicle seat suspension.

In at least some vehicle seat suspensions which utilize a scissors arm linkage arrangement, height adjustment is accomplished using a height adjustment mechanism that lies outside of the scissors linkage. As a result, it can restrict its use to seating applications which have a relatively large space to accommodate the seat and its suspension. In at least one prior art vehicle seat suspension that utilizes a scissors linkage arrangement, the height adjust is an upstop adjuster that affects suspension travel during operation. Unfortunately, by adjusting the height of the seat, this suspension construction also causes its weight setting to be affected, particularly when the suspension approaches and is at its mid-travel position. This is because adjusting seat height can also increase or decrease the preload on a single bar torsion spring suspension mechanism of this type of seat suspension. This also can disadvantageously require a seat occupant to set and reset the height and weight adjustment several times before achieving the desired balance between seat height and suspension weight support.

Unfortunately, for many of these suspensions, performing weight adjustment of the suspension to accommodate the weight of the seat occupant can also change the shape of the load-deflection curve of the suspension. This results in a seat suspension having so many variables that it can be difficult to easily predict its behavior over all seat height and weight adjustment settings. Moreover, it is undesirable to have the shape of the load-deflection curve change as weight adjustment is varied because different weight settings may not adequately dampen shocks and jolts to protect or keep stable the seat occupant.

SUMMARY OF THE INVENTION

A suspension for a vehicle seat having a scissors arm linkage arrangement with a pair of load carrying flexible members secured to a pair of springs and in operable communication with a cam shaped pulley carried by the scissors arm linkage arrangement for producing a suspension of compact structure, which enables seat height to be adjusted independently of the adjustable weight compensating characteristics of the suspension, and which produces a seat suspension having favorable load-deflection characteristics during operation. The suspension has a platform for carrying the seat which overlies the scissors arm linkage and a base underlying the linkage that supports the suspension and permits mounting of the suspension to the floor or undercarriage of a vehicle.

To permit height adjustment, the springs and flexible members are movable preferably in unison relative to the platform for selectively controlling how far the seat platform is spaced from the base. To permit weight adjustment, the springs can be selectively tensioned to apply a preload to the suspension, thereby selectively varying the amount of resistance the suspension applies against a load, such as from the weight of a person sitting on a seat carried by the suspension.

The suspension has a first spring hanger carried by a threaded suspension anchor rod attached to the seat platform for securing the springs in operable communication with the seat platform. The springs are attached at their ends to the first spring hanger with the spring hanger threadably secured to the rod such that rotation of the rod moves the spring hanger axially along the rod.

The suspension also has a second spring hanger that is in operable communication with the springs and flexible members. Preferably, the second spring hanger is capable of limited pivoting movement about the anchor rod for enabling it to function as an evener for accommodating differences in length between flexible members or suspension springs, or differences in length due to mislocation of suspension components. By functioning as an evener, the second spring hanger preferably also functions as a load evener for accommodating a suspension having uneven forces being transmitted by its flexible members and/or springs during suspension operation.

The second spring hanger receives and secures the opposite end of the springs, as well as, one end of each flexible member. At its other end, each flexible member is secured to the scissors arm linkage. Preferably, each flexible member is looped around a pulley carried on a mounting shaft of the linkage arrangement before each flexible member is secured to the linkage arrangement.

The scissors arm linkage arrangement of the suspension includes two pairs of inner and outer links with each pair of inner and outer links secured together by a pivot for enabling movement of the inner links relative to the outer links about the pivot to allow the linkage to collapse and expand during suspension use and operation thereby permitting the suspension to travel in response to bumps, jolts and the like. As a result, this scissors arm linkage arrangement also advantageously enables the distance between the seat platform and base to be controllably varied, which thereby enables easy seat height adjustment. In the construction of the scissors arm linkage, each inner and outer link have one end in operable communication with the seat platform and their other end in operable communication with the suspension base.

Preferably, one end of each outer link is pivotally secured to the seat platform, preferably by a mounting shaft, and one end of each inner link is pivotally secured to the suspension base, preferably by another mounting shaft. Preferably, the other end of the outer links are carried on rollers within guideways of the suspension base to enable each end of the outer links to move within the guideways relative to the suspension base. Preferably, the other end of each inner link is also carried on a roller within a guideway of the seat platform to enable the ends of the inner links to move within the guideways relative to the seat platform. As a result, the construction and arrangement of the scissor linkage enables the suspension to preferably smoothly and controllably collapse and expand during operation.

Preferably, each inner link has a flexible member mount and a cam shaped pulley that are each in operable communication with one of the flexible members. Preferably, the flexible member mount is a mounting peg that is attached to or integral with an inner link of the scissors linkage. Preferably, each flexible member is secured to the mounting peg and bears against or engages the cam shaped pulley. In a preferred mounting arrangement, each flexible member is mounted to a peg which is adjacent to the scissors linkage pivot and which can overlie or be coaxial with the center (axis) of the pivot.

Preferably, the outer profile of each cam-shaped pulley is offset from each pivot of the scissors linkage arrangement for creating a moment arm about the pivot that resists collapse of the seat suspension in response to a force or forces applied to the suspension. These forces can be from the weight of a person sitting down on a seat carried by the suspension or from bumps, jolts, or vibrations encountered during vehicle operation.

Preferably, the cam shaped pulley varies the length of the moment arm about the pivot created by each flexible member as the scissors linkage collapses for varying the resistance to suspension collapse in proportion to the amount of suspension deflection, suspension travel, or suspension collapse, that has occurred. Preferably, the construction and arrangement of each cam-shaped pulley relative to the scissors linkage pivot increases the length of the moment arm as the suspension collapses to increase resistance to collapse. In this context, the terms "suspension deflection", "suspension travel", and "suspension collapse" all mean the same thing and refer to movement of the scissors linkage.

Preferably, it is the profile of the cam shaped pulley that causes the length of the moment arm to vary about the pivot for varying resistance to suspension collapse. Preferably, the profile of the cam-shaped pulley causes the resistance to collapse to vary approximately in proportion to the amount of load applied to the suspension. Preferably, the profile of the cam shaped pulley increases the length of the moment arm as the scissors linkage and suspension collapses to increase resistance to collapse. Preferably, the shape or profile of the cam shaped pulley is generally elliptical and the cam-shaped pulley can be offset from the pivot such that as the linkage collapses, the cam rotates and the point of contact of (or point of separation from) the flexible member with the cam-shaped pulley changes, increasing the length of the moment arm about the pivot point as the suspension collapses.

Preferably, the profile of the cam shaped pulley provides the suspension with relatively smooth force-deflection resisting characteristics that are preferably substantially linear. Preferably, the construction and arrangement of the components of the suspension and the profile of each cam shaped pulley also helps to enable weight adjustment of the suspension to be performed without substantially changing the load-deflection characteristics of the suspension for a wide range of seat occupant weights.

As such, the construction and arrangement of the cam shaped pulley preferably provides the suspension with force/load-deflection characteristics that increase the resistance to suspension collapse substantially linearly in relation to the amount of deflection of the suspension. Alternatively, the construction and arrangement of the cam shaped pulley can be such that it can have force/load-deflection characteristics that differ from linear, such as for tailoring the force/load-deflection characteristics of the suspension to different vehicle seating applications as well as to various terrains that are to be encountered by a vehicle.

Preferably, each flexible member is substantially inelastic along its longitudinal dimension and is at least somewhat flexible to facilitate assembly and use. Each flexible member is substantially inelastic such that it has a spring rate of at least approximately 2,000 pounds per inch, preferably has a spring rate of at least about 6,000 pounds per inch and which can approach infinity. To produce a flexible member having a suitably high spring rate, each flexible member preferably is a flexible belt having a load carrying portion that is preferably constructed of an aramid material or another suitably strong and tough material. To facilitate assembly of the suspension, each belt preferably is an endless belt. If desired, a flexible strap or belt that is not of endless construction could be directly anchored to the suspension, such as by being attached or looped to one of the links of the scissors linkage.

To facilitate weight adjustment of the suspension, the spring hangers can be moved relative to each other to selectively tension the springs by spreading them apart or by contracting the length of the springs. To perform weight adjustment, the suspension anchor rod is attached to a weight adjustment knob that is selectively rotated during weight adjustment to rotate the rod. In performing weight adjustment, as the suspension anchor rod is rotated, it moves the first spring hanger relative to the other spring hanger, spreading or compressing the springs, thereby selectively tensioning each spring and preloading the suspension. During weight adjustment, the flexible members do not move preventing the scissors linkage from collapsing or expanding thereby resulting in weight adjustment not affecting seat height.

To facilitate height adjustment of the suspension, both spring hangers are moveable in unison relative to the seat platform to move the springs and flexible members selectively toward or away from the front of the seat platform, thereby selectively controlling the distance between the seat platform and suspension base. Preferably, both spring hangers are in operable communication with a height adjustment knob that is threadably received by the seat platform and which can be rotated to selectively move the spring hangers, springs, flexible members, and threaded anchor rod, preferably in unison, relative to the seat platform to controllably collapse or expand the scissors arm linkage arrangement while not changing the preload of the springs. As a result of not changing the preload of the springs, height adjustment is independent of weight adjustment.

Therefore, weight adjustment is advantageously independent of height adjustment and does not change the distance between the seat platform and suspension base because stretching each spring during weight adjustment does not displace any flexible member. Advantageously, height adjustment is likewise independent of weight adjustment because adjustment of seat height preferably does not change spring tension or preload.

Objects, features and advantages of this invention are to provide a suspension for a vehicle seat that can support a load placed on its seat platform; is able to absorb loads applied to the suspension due to jolts, bumps and shocks encountered during operation of a vehicle; utilizes a load carrying flexible member for producing a suspension of compact construction enabling it to be used in relatively small spaces; utilizes a cam-shaped pulley which varies the moment arm about a pivot of the scissors linkage for producing a suspension having substantially linear load/force-deflection characteristics; utilizes a cam-shaped pulley that is preferably fixed and which can be produced with a profile that imparts certain desired force/load-deflection characteristics to the suspension for tailoring the force/load-deflection characteristics to the use or application of the suspension; eliminates the need for more expensive cam and follower arrangements thereby producing a suspension of reduced cost; is a suspension that can be constructed and arranged to be compact in structure; allows weight adjustment of the seat suspension to be performed without affecting its height adjustment; allows height adjustment of the suspension to be performed without substantially affecting its weight adjustment; is a suspension which allows for a wide range of height and weight adjustment settings for accommodating seat occupants of a wide variety of sizes and weights; is a suspension that can be constructed and arranged to have a low natural frequency which is not easily excited into instability; is a suspension which can be constructed and arranged to have a stability-enhancing natural frequency that is below four hertz; and is a seat suspension that is strong, rugged, easy to assemble, durable, of simple design, compact construction, economical manufacture and which is easy to use and operate.

BRIEF DESCRIPTION OF THE DRAWINGS

These and other objects, features, and advantages of this invention will become apparent from the following detailed description of the best mode, appended claims, and accompanying drawings in which:

FIG. 8 is a sectional elevation view of the vehicle seat suspension illustrating the seat platform near or at a mid stroke position with the height adjust of the suspension set at its highest setting;

FIG. 9 is a sectional elevation view of the vehicle seat suspension illustrating the seat platform near or at its full down stroke position with the height adjust of the suspension set at its highest setting;

FIG. 10 is a sectional elevation view of the vehicle seat suspension illustrating the seat platform near or at its full up stroke position with the height adjust of the suspension set at its lowest setting;

FIG. 11 is a sectional elevation view of the vehicle seat suspension illustrating the seat platform near or at a mid stroke position with the height adjust of the suspension set at its lowest setting.

DETAILED DESCRIPTION OF THE INVENTION

Figure 1:
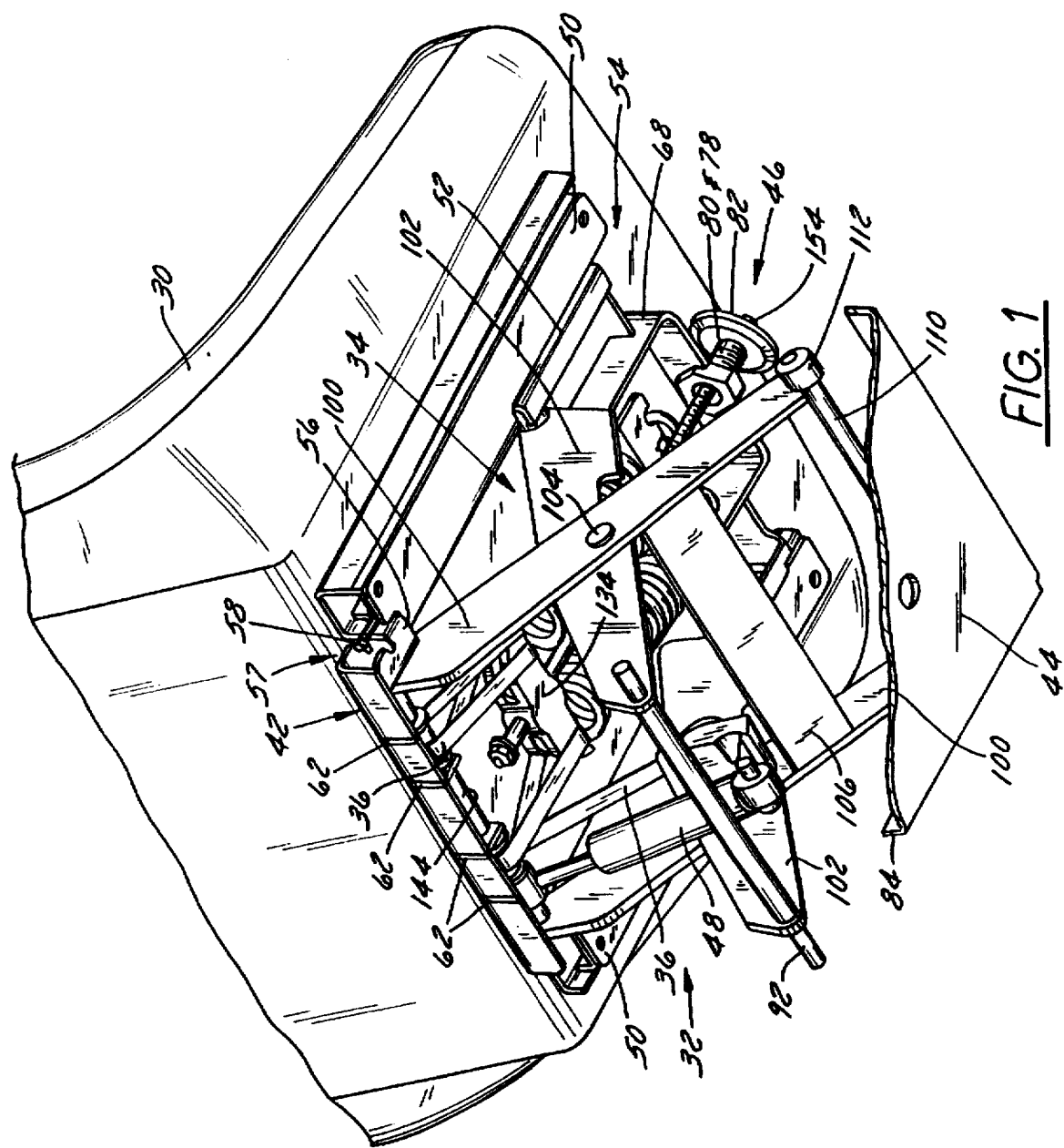
FIG. 1 is a bottom perspective view of a vehicle seat depicting a seat suspension of this invention with a portion of its base plate removed for clarity.

Referring to the drawings, FIG. 1 illustrates a seat 30 that is supported on a suspension 32 of this invention having a scissors arm linkage arrangement 34 with a pair of load carrying flexible members 36 secured to a pair of springs 38 and in operable communication with a pair of fixed cams that are cam shaped pulleys 40 carried by the scissors arm linkage arrangement 34 for (a) producing a suspension 32 of compact structure, (b) enabling seat height to be adjusted independently of the weight supporting characteristics of the suspension 32, and (c) producing a seat suspension 32 having favorable load-deflection or force-suspension travel characteristics that can be tailored to specific vehicle seating suspension applications.

Figure 2:
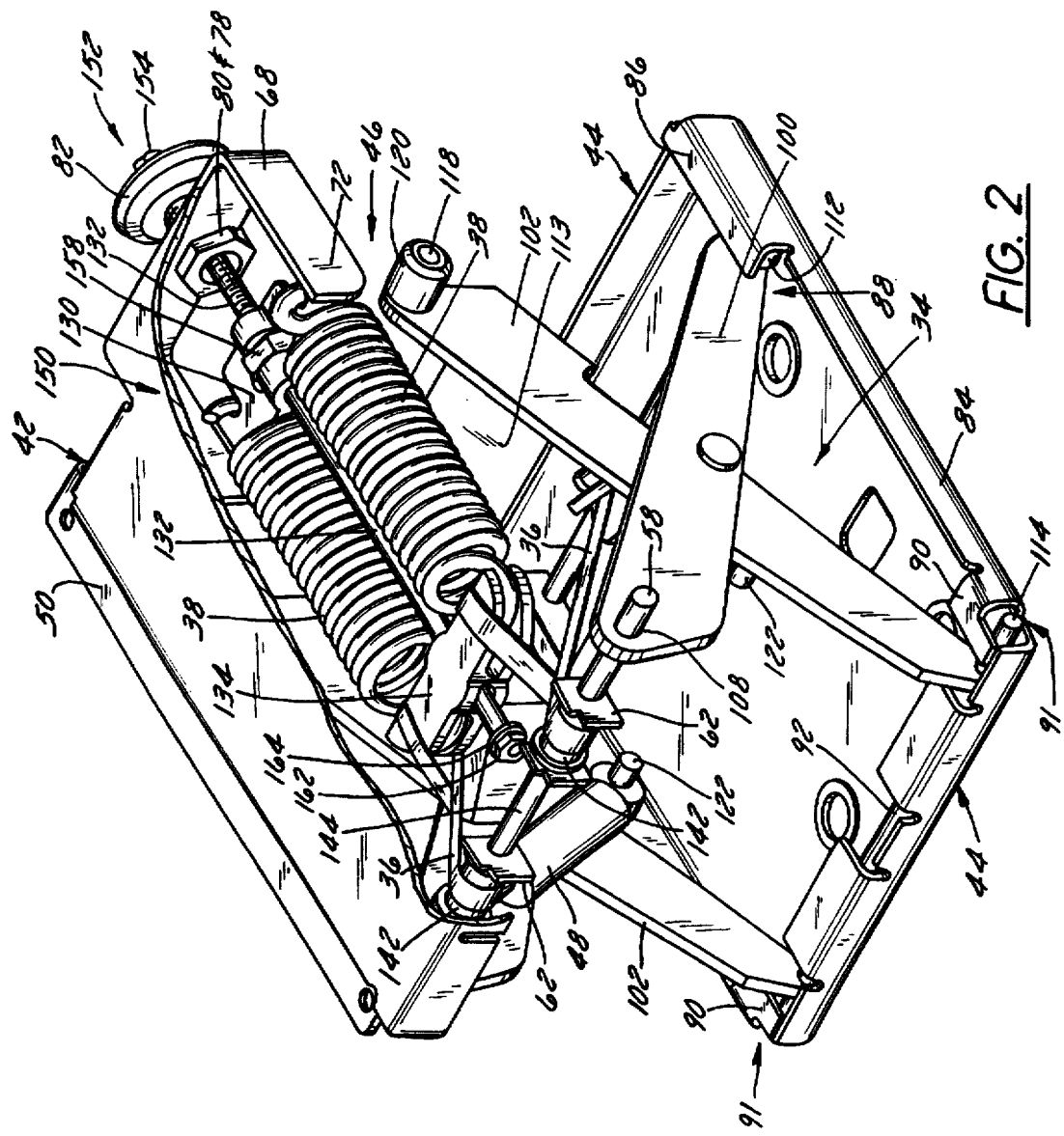
FIG. 2 is a top perspective view of the vehicle seat and suspension with a portion of its seat platform removed for clarity.

The seat 30 is carried on a seat platform 42 that is in turn mounted to one end of the scissors linkage 34. As is also shown in FIG. 2, the opposite end of the scissors linkage 34 is mounted to a base plate 44 which is preferably secured to a portion of the vehicle, such as its undercarriage, frame, floor pan, or chassis (not shown). To enable the height of the seat 30 to be adjusted and for helping to tune the suspension 32 to the weight of a seat occupant, a weight and height adjustment assembly 46 is carried by the seat platform 42. To dampen vibration and prevent sudden accelerations and/or decelerations of the suspension 32 due to severe bumps, jolts, or other suspension loading conditions, the suspension 32 preferably has a dampener 48, that preferably can be a shock absorber 48, coupled at one end to the scissors linkage 34 and at its other end to the seat platform 42.

Although the suspension 32 preferably has the springs 38 and flexible members 36 carried by the seat platform 42, with the springs 38 being in operable communication with the platform 42, the springs 38 and flexible members 36 could also be carried by the suspension base 44. If carried by the base 44, the springs 38 can be in operable communication with the base 44 preferably by being anchored to the base 44. This would result in a seat suspension essentially having an upside down configuration from the suspension 32 depicted in FIGS. 1 & 2.

Seat Platform

The seat platform 42 preferably is a plate and is shown having an outwardly extending flange 50 along each side for carrying tracks (FIG. 1) which cooperate with the vehicle seat 30 to enable the seat 30 to be selectively moved forwardly or rearwardly along the platform 42 to adjust how close or how far away the seat 30 is from the dash panel or a steering mechanism of the vehicle. To enable the scissors linkage 34 to collapse during operation of the seat suspension 32, adjacent the front of the seat platform 42 is an in-turned flange 52 along each side that preferably has a generally U-shaped cross section, each flange 52 of which serves as upper linkage guideways 54 for movably receiving a portion of the scissors linkage 34. When received in the upper guideways 54, the scissors linkage 34 can travel along the platform 42 as it preferably controllably collapses, such as when a bump or jolt is being absorbed by the vehicle seat suspension 32 or when a person is sitting down on the seat 30.

At the rear of the seat platform 42 are a pair of shaft retaining holes for receiving and retaining an upper mounting shaft 58 of the scissors linkage 34. To prevent the upper scissors linkage mounting shaft 58 from sliding free of the seat platform 42 by axially restraining the shaft 58, the platform 42 can have a cap, or another type of shaft retainer, at each end of the shaft 58, with each cap or shaft retainer preferably being secured to the seat platform 42, such as adjacent its retaining flanges 56. Retainer cap can be of a configuration similar to cap 94 (bearing block) shown in FIG. 4. Preferably, however, no retainer is required to keep the shaft 58 from sliding free of the seat platform 42.

To radially support the upper scissors linkage mounting shaft 58, the seat platform 42 preferably has four inwardly extending support arms 62 along its rear. As is also shown more clearly in FIG. 2, each mounting shaft support arm 62 is a plate having a through opening for receiving the upper scissors linkage mounting shaft 58. To receive and retain each mounting shaft support arm 62, the seat platform 42 has complementary spaced apart slots 66 (FIG. 4) for receiving an end of a support arm plate 62. Preferably, after being received in its appropriate slot 66, each support arm 62 is securely fixed to the platform 42 such as by welding or another means of securing or attaching the arm 62 to the platform 42. If desired, the platform 42 can be constructed with the support arms 62 integral with the platform 42.

Figure 3:
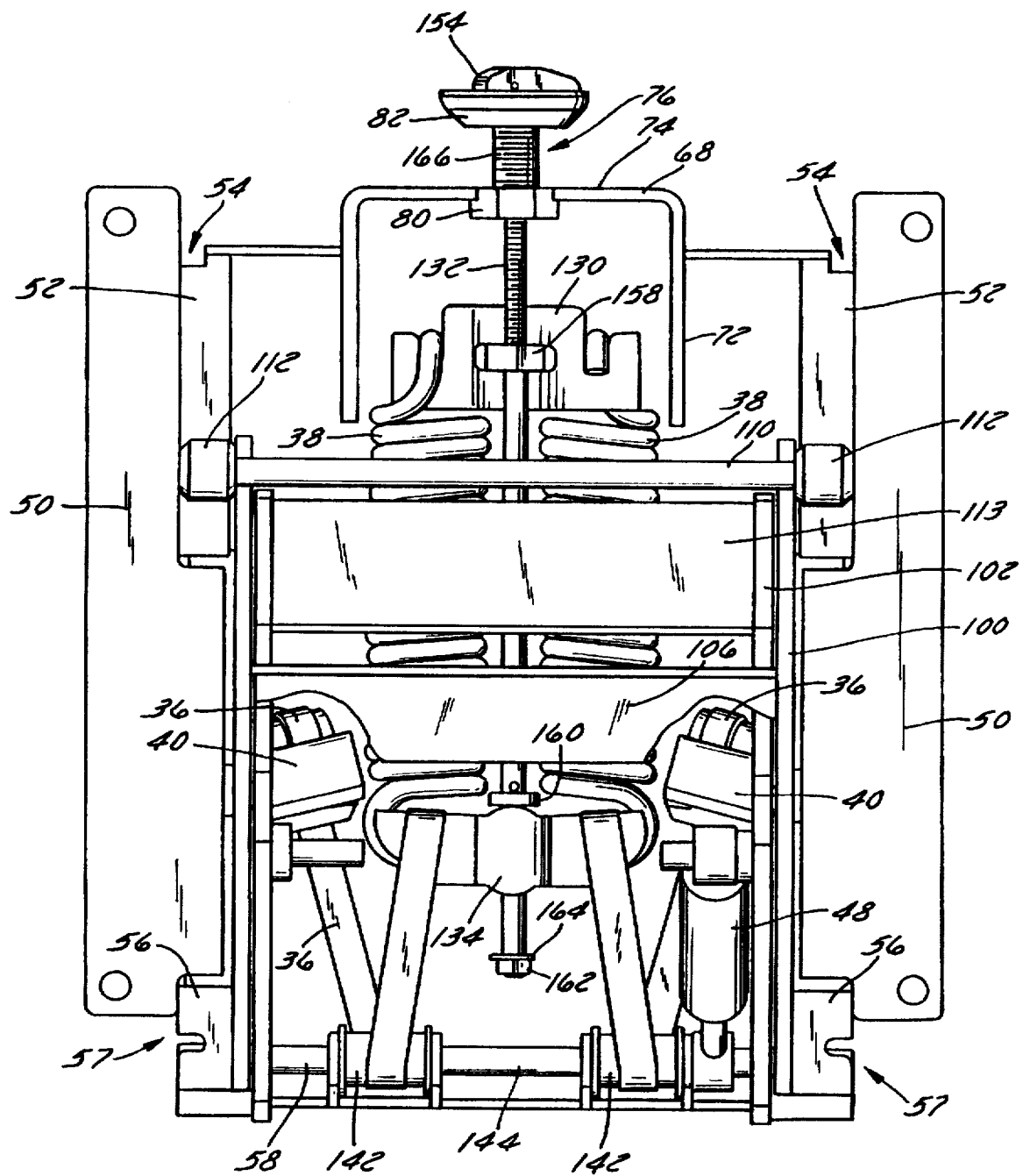
FIG. 3 is a cross sectional view of the vehicle seat suspension illustrating the suspension from underneath the seat platform.

To mount the suspension 32 and its vehicle seat weight and height adjustment assembly 46 to the seat platform 42, the platform 42 has a downwardly extending, U-shaped mounting bracket 68 at its front. Preferably, the suspension mounting bracket 68 can be a separate component, as is more clearly depicted in FIG. 2, that is secured to the platform 42 by welding or another adhesive means. As is also shown in FIG. 3, the bracket 68 has a pair of legs 72, a front face 74, and an opening in the front face 74 for mounting a shaft receiver 78 that is preferably threaded for receiving a shaft. Preferably, the receiver 78 is a threaded nut 80 for threadably receiving a threaded height adjustment knob 82 of the weight and height adjustment assembly 46. Preferably, the nut 80 is immovably fixed to the suspension mounting bracket 68 such as by welding, through the use of fasteners, by a tight friction fit, by an adhesive, or another means of attachment.

Seat Base

Figure 4:
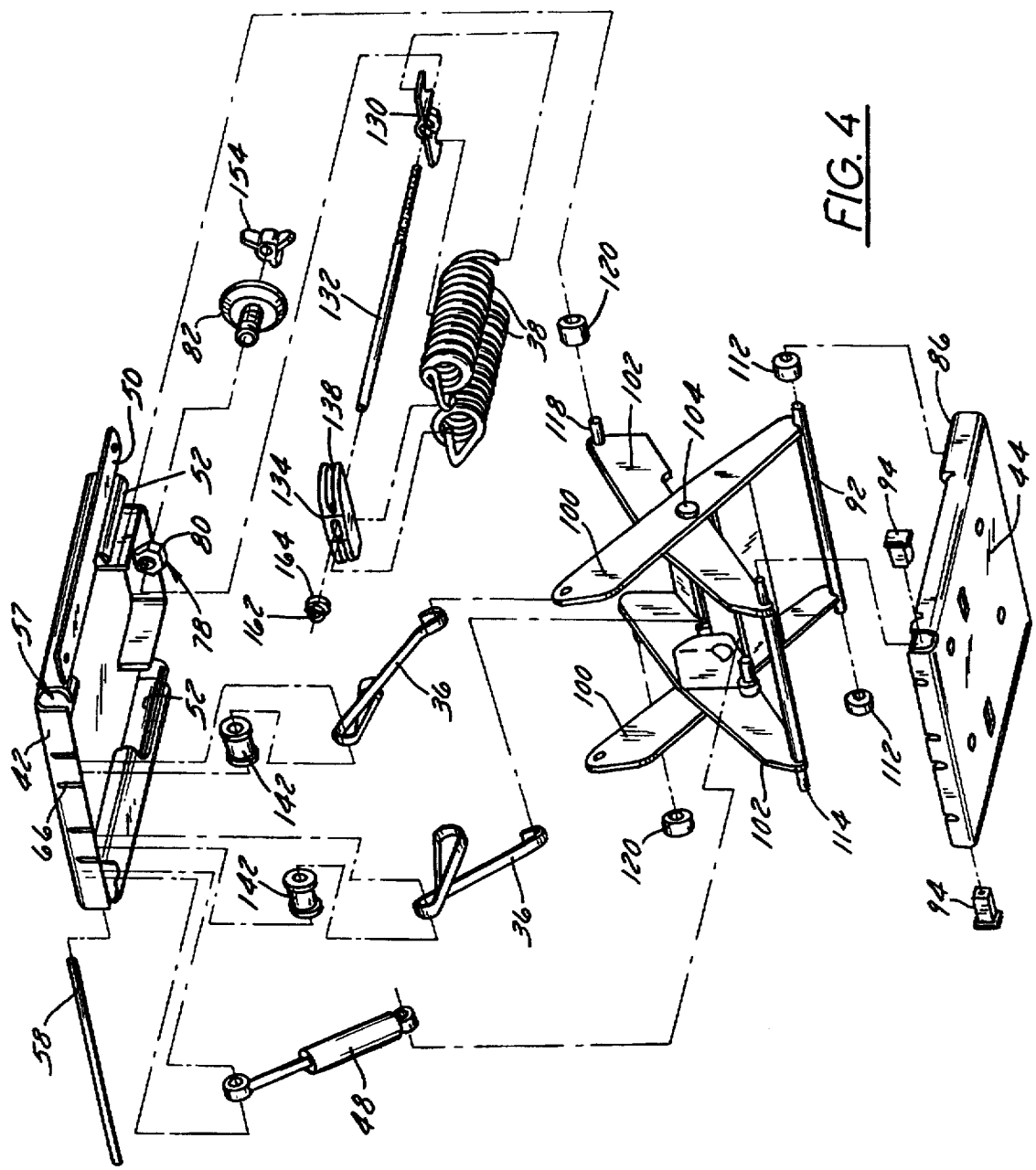
FIG. 4 is an exploded view of the vehicle seat suspension of this invention.

Referring to FIGS. 2–4, the vehicle seat suspension base 44 is preferably a plate that has an upturned flange 84 about its periphery preferably to increase strength and improve stiffness of the plate 44. To enable the scissors linkage 34 to collapse during operation of the seat suspension 32, the front of the base 44 has an in-turned flange 86 (FIG. 2) along each side of the base 44 which serves as lower linkage guideway 88 for movably receiving a roller 112 of the scissors linkage 34. When received in the lower guideways 88, the scissors linkage 34 can travel along the base 44 as it preferably controllably collapses, such as when a bump or jolt is being absorbed by the vehicle seat suspension 32 or when a person is sitting down on the seat 30.

At the rear of the suspension base 44 are a pair of in-turned shaft retaining flanges 90 defining a shaft retaining pocket 91 (FIG. 2) for permitting a lower mounting shaft 92 of the scissors linkage 34 to be received and retained. To prevent the lower scissors linkage mounting shaft 92 from coming free of the base 44 by preferably axially restraining and retaining the shaft 92, the base 44 preferably has a bearing block 94 (FIG. 4) at each end of the lower shaft 92, each of which is secured to the suspension base 44 adjacent its retaining flanges 90.

Scissors Arm Linkage Arrangement

The scissors arm linkage arrangement 34 is depicted in FIGS. 1 & 2 and is positioned between the seat platform 42 and suspension base 44 of the seat suspension 32 for enabling the seat 30 to move vertically relative to the base 44, such as for enabling adjustment of seat height or movement of the seat 30 in response to bumps, jolts or other suspension loading encountered during vehicle operation. In operation of the suspension 32, the springs 38 and flexible members 36 cooperate with the scissors arm linkage arrangement 34 for preventing collapse of the linkage 34 thereby supporting an occupant in the seat 30 while cushioning the occupant from shocks, jolts and vibration.

The scissors linkage arrangement 34 has a pair of outer links 100 overlapping and secured to a pair of inner links 102 by pivots 104. The outer links 100 are spaced apart by a cross beam 106 that can be integrally cast with the links 100 or can be a separate component affixed to each link 100, such as by welding or another adhesive or fastening method. To be rotatively supported by the upper scissors linkage mounting shaft 58, each outer link 100 preferably has a journal 108 at one end which is received over an end of the shaft 58. To enable the scissors linkage arrangement 34 to collapse and expand during operation of the suspension 32, each journal 108 preferably can rotate on the shaft 58 or the shaft 58 can rotate relative to the platform 42. At their opposite ends, the outer links 100 each have an axle 110 (FIG. 1) with a roller 112 received at each end of the axle 110. The axle 110 may be integral with the links 100 or may be a separate component affixed to the links 100, such as by welding or the like.

Preferably, each roller 112 is journalled for rotation on the axle 110. Each roller 112 preferably has a diameter that enables it to be received in a guideway 88 of the suspension base 44 enabling the rollers 112 to move along the guideways 88 during suspension operation permitting the linkage 34 and suspension 32 to smoothly collapse and expand in response to a load applied to the seat 30, such as bumps and jolts encountered during vehicle operation. Each roller 112 can also be rotatively supported by bearings (not shown) for enabling each roller to rotate freely on the axle 110 by minimizing friction. Each roller 112 is constructed of a resilient, durable, and long lasting material, such as preferably a nylon, a metal, or another resilient and durable material.

The inner links 102 are spaced apart and supported by a cross beam 113 (FIG. 3) that is preferably integrally cast with the links 102. At one end of the links 102, the lower mounting shaft 92 can also preferably be integrally cast with the links 102 and has a pair of journalled axle shafts 114 (FIG. 4) extending outwardly which are preferably received in bearing blocks 94 affixed to the base plate 44 for permitting the shaft 92 to freely rotate relative to the base 44 as the suspension 32 collapses and expands during operation. Each bearing block 94 is received in a shaft retaining pocket 91 of the base 44. Each bearing block 94 is preferably retained in its shaft retaining pocket 91 (FIG. 2, seat suspension shown with bearing block 94 removed). At the opposite end, the inner links 102 have stub axle shafts 118 for receiving rollers 120 thereon. Each roller 120 is preferably constructed substantially similar to roller 112, with each roller 120 received in a guideway 54 of the seat platform 42 for travelling along the guideways 54 during suspension operation to facilitate smooth and controlled collapse and expansion of the linkage arrangement 34 and suspension 32.

As is shown more clearly in FIG. 2, along the inner surface of one of the inner links 102 is a mounting peg 122 for receiving one end of the dampener 48. Although the suspension 32 of this invention will successfully function without a dampener 48, it is preferred that at least one dampener 48 be used, with the dampener 48 mounted between the mounting peg 122 of an inner link 102 and the upper scissors linkage mounting shaft 58. If desired, more than one dampener can be used. For example, two dampeners can be used, with a dampener mounted between each peg 122 of each scissors link and the mounting shaft 58.

When assembled, the ends of the links 100 & 102 secured to the mounting shafts 58 & 92 pivot about the mounting shafts 58 & 92 as the opposite ends of the links 100 & 102 travel on rollers 112 & 120 within the guideways 54 & 88 of the seat platform 42 and base 44 during collapse and expansion of the scissors arm linkage arrangement 34. As the ends of the links 100 & 102 travel outwardly on the rollers 112 & 120, each pair of inner and outer links 100 & 102 also pivot about pivot point 104 enabling the scissors linkage 34 to collapse thereby lowering the seat platform 42 toward the base 44. Advantageously, the scissors linkage 34 enables the seat 30 to substantially vertically fall and raise during operation without the seat 30 moving along an arcuate path toward or away from the vehicle dash panel.

The maximum range of movement of the scissors linkage 34, as well as other components of the suspension 32, affect the maximum stroke of the seat suspension 32. The maximum stroke of the seat suspension 32 is how far the seat platform 42 can be moved toward the base 44 during operation of the suspension 32, such as during absorbing shocks or jolts encountered by the suspension 32 during vehicle operation.

Also extending inwardly along the inner surface of each inner link 102 is a mounting peg 124 for receiving the flexible member 36 of the seat suspension 32. As is shown in FIG. 1 and depicted more clearly in FIG. 3, the flexible member 36 is preferably looped around the mounting peg 124 and bears against the fixed cam or cam shaped pulley 40. Another example of a suitable scissors arm linkage is that shown and described in Donovan, et al., U.S. Pat. No. 5,364,060 assigned to the assignee herein, the disclosure of which is hereby incorporated by reference.

Suspension

As is shown in FIG. 4, the seat suspension 32 includes the springs 38 secured at one end to the front of the mounting platform 42 and at the other end to the flexible members 36 which are, in turn, secured to one pair of the links, 100 or 102, of the scissors arm linkage arrangement 34. Preferably, a pair of springs 38 are used, with the springs 38 anchored and attached at one end to the seat platform 42 by a spring hanger 130 and suspension anchoring rod 132 that is secured to the suspension mounting bracket 68. At their other end, the springs 38 are operably connected to the flexible members 36, which are, in turn, secured to one pair of links, 100 or 102, of the scissors arm linkage arrangement 34. Preferably, each flexible member 36 is secured to the inner link 102 of the scissors arm linkage arrangement 34, as is depicted in FIGS. 1–5. To balance forces applied to the springs 38 during operation of the suspension 32 and to accommodate differences in length of the flexible members 36 and springs 38, both springs 38 are preferably mounted, along with the flexible members 36, on another spring hanger 134 that functions as a load evener or spring evener and which preferably can help to compensate for uneven forces applied to the seat suspension.

The opposite end of each flexible member 36 is preferably secured to the mounting peg 124 of an inner link 102 of the scissors linkage. As is shown in FIG. 3, one of the flexible members 36 is secured to a mounting peg 124 of one of the inner links 102 and the other of the flexible members 36 is secured to a mounting peg 124 of the other of the inner links 102. As is depicted more clearly in FIG. 5, each flexible member 36 is secured to the mounting peg 124 of an inner link 102 with at least a portion of the flexible member 36 bearing or pressing against the cam or pulley 40.

As is shown in FIGS. 3 & 4, the spring evener 134 has a bore (FIG. 4) for receiving the suspension anchor rod 132 through the spring evener 134 permitting the evener 134 to move along the rod 132 during suspension operation. As is also depicted in FIG. 4, to mount each flexible member 36 on the evener 134, the evener 134 has a pair of spaced apart retainer pockets 138. To securely mount each spring 38 to the evener 134, there are a pair of spaced apart grooves and arcuate channels in the evener 134, with each groove and channel for receiving a hooked end of a spring 38 (FIG. 3).

The spring evener 134 is preferably also capable of limited pivoting movement relative to the anchor rod 132 for enabling it to compensate for differences in length of the flexible members 36 and/or springs 38 and for tolerating uneven forces being transmitted by one flexible member 36 and spring 38 relative to the other flexible member 36 and spring 38. To enable the spring evener 134 to pivot, each end of its bore is countersunk with the angle and diameter of each countersink preferably determining the pivoting limits of the spring evener 134.

Preferably, the spring evener 134 is constructed of a glass filled nylon for providing the evener 134 with the desired rigidity and strength necessary to perform as a spring hanger while also minimizing vibration and permitting it to easily slide on the suspension anchor rod 132 during operation with a minimum of friction and wear. If desired, another material could be used for the evener 134, such as for example, a suitable steel or metal or another composite, such as, for example, a carbon fiber composite that can be impregnated with a lubricant for minimizing friction and wear as it travels along the rod 132.

To facilitate the transmission of forces between the springs 38 and inner links 102 of the scissors linkage 34 while producing a suspension 32 of compact construction, each flexible member 36 is looped around a pulley 142 carried on the upper scissors linkage mounting shaft 58 that is secured to the seat platform 42. Advantageously, the pulleys 142 permit each flexible member 36 to be mounted to a link of the scissors arm linkage 34 along a direction that is laterally outwardly skewed from its point of attachment to the spring evener 134 for producing a suspension 32 of compact construction. Preferably, in assembly, each flexible member 36 is secured at one end to the spring evener 134, wrapped underneath and around its corresponding pulley 142 in the manner shown in FIG. 2, and secured at its other end to the mounting peg 124 of an inner link 102.

To permit each flexible member 36 to freely and smoothly rotate relative to the shaft 58 and seat platform 42, each pulley 142 is carried on bearings that can be roller bearings (not shown). To provide a pulley 142 of durable construction, each pulley 142 is preferably constructed of a nylon or another similarly durable material.

To prevent the spring evener 134 from excessively travelling along the suspension anchoring rod 132, while also preferably limiting the stroke of the suspension 32, the rod 132 has a downstop 162 (FIG. 3) at its free end. To controllably decelerate, or bring to a stop, the suspension 32 during operation as the springs 38 are stretched such that the spring evener 134 nears the end of its travel on the rod 132, the rod 132 has at least one bumper 164 (FIG. 3) between the downstop 162 and spring evener 134. Preferably, the bumper 164 is a generally cup-shaped washer, such as preferably a Belleville-type washer, a cone washer, a spring washer, or another type of bumper constructed of a springy and resilient material for cushioning the spring evener 134 as it nears the end of travel so that it does not abruptly and directly impact against the downstop 162, thereby also preventing travel of the suspension 32 from being brought to an abrupt halt. As a result of using one or more of these bumpers 164 which are preferably Belleville-type washers, seat occupant comfort is preferably maximized as the suspension 32 nears the end of its stroke.

When the suspension 32 is assembled, the springs 38 and flexible members 36 cooperate with the scissors arm linkage 34 to support a load on the seat platform 42, such as from the weight of a person sitting in the seat 30, while preventing collapse of the linkage 34. To prevent collapse of the scissors linkage arrangement 34, each flexible member 36 bears against a cam or pulley 40 at a distance from the pivot 104 of the linkage 34 creating a moment opposing suspension collapse. Forces applied to the seat platform 42 and base 44 during operation, such as from shocks, jolts and vibration, are absorbed by the springs 38 and preferably are also dampened by the dampener 48.

To improve crashworthiness of the suspension 32 when experiencing particularly severe loading, such as the type of suspension loading that can occur during a vehicle crash, a flexible belt (not shown) that is preferably constructed of a flexible and stretchable woven material can be looped between the scissors arm linkage mounting shafts 58 & 92. As is generally indicated in FIG. 1 by reference numeral 144, if such a belt is used, it is preferably mounted adjacent the middle of the upper mounting shaft 58 and extends downwardly to the lower mounting shaft 92. Preferably, the belt is long enough so as not to interfere with the stroke of the suspension 32 during normal suspension operation. Preferably, the belt is constructed of woven nylon that preferably is the same material that is used to construct safety or seat belts for automotive vehicles. Preferably, such a belt can be of endless construction.

Springs

As is shown in FIG. 4, the springs 38 are preferably coil springs in tension, with each spring 38 having one end attached to the spring hanger 130, secured by the anchor rod 132 to the seat platform 42, and its other end attached to the spring evener 134. As such, the springs 38 are preferably connected to the spring hangers 130 & 134 such that the springs 38 are connected in parallel. Preferably, each spring 38 has a spring rate, K, which, when acting in concert with the flexible members 36, helps to prevent the scissors arm linkage 34 from collapsing when under load while cushioning and supporting a seat occupant.

If desired, compression springs can also be used. If compression springs are used, the spring evener 134 is preferably located at the front of the seat platform 42 and the spring hanger 130 is preferably located towards the rear of the platform 42 with the compression springs located between the spring hangers. The flexible members 36 would still be mounted on the spring evener 134, as is done when tension springs 38 are used. If desired, springs with progressive spring rates can be used, if it is desirable to vary resistance to loading of the suspension 32 as the scissors arm linkage 34 collapses or expands.

Flexible Members

As is also shown in FIGS. 1, 2, 3, 5A & 5B, the suspension 32 has a pair of flexible members 36 that are carried on and spaced apart by the spring evener 134, with each flexible member 36 wrapped partially around pulley 142 and having its opposite end attached to mounting peg 124 of scissors arm link 102. Since each flexible member 36 is mounted to the suspension 32 in a preferably substantially symmetrical manner, the mounting, construction and arrangement of only one of the flexible members 36 will be further described.

To help create and maintain a moment arm, M, about the pivot 104 of the scissors linkage 34 that tends to oppose collapse of the suspension 32, the flexible member 36, cam-shaped pulley 40, and flexible member mounting mechanism, such as peg 124, is preferably constructed and arranged so that the flexible member 36 maintains at least some contact with the pulley 40 during operation. Preferably, the flexible member 36 can be urged or forced against the pulley 40 to help maintain contact with the pulley 40. Preferably, the flexible member 36 maintains at least some contact with the pulley 40 during operation of the suspension 32. Preferably, the flexible member 36 maintains at least some contact with the pulley 40 at all times during suspension operation.

Figure 5A:
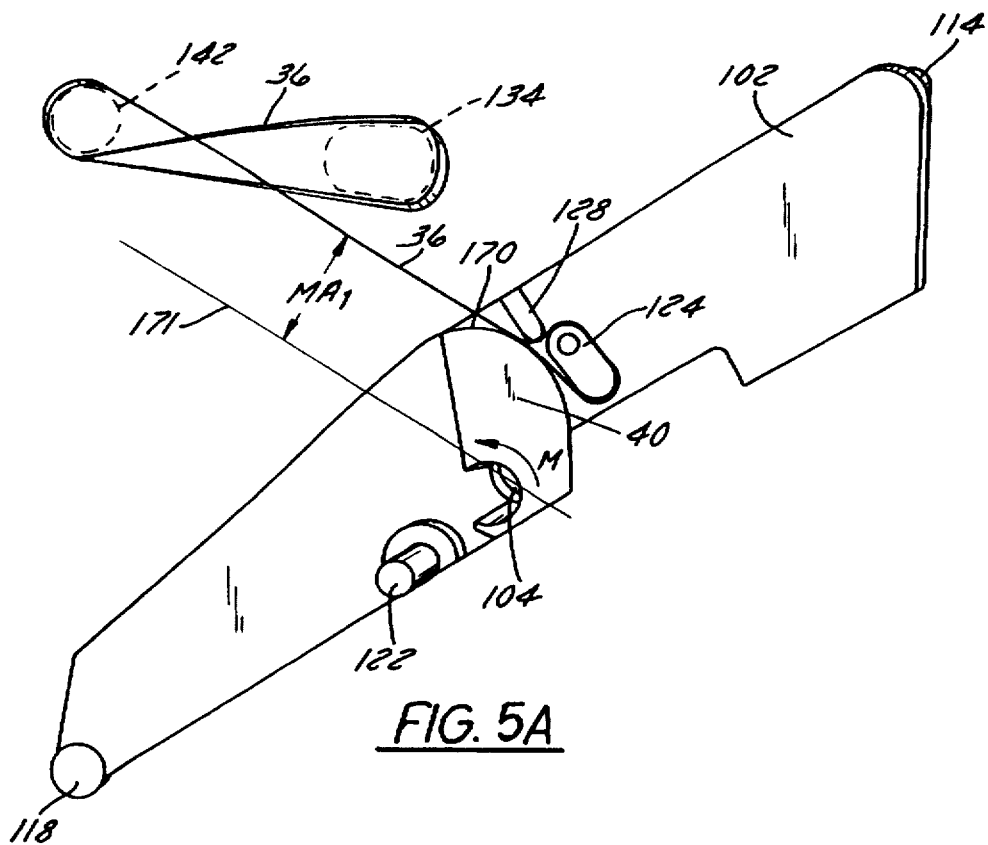
FIG. 5A is an enlarged side view of a link of the scissors arm linkage of the suspension illustrating a load carrying flexible member bearing against a cam-shaped pulley and mounted to the link a distance away from a pivot of the scissors linkage for creating a moment about the pivot point for preventing collapse of the scissors linkage.
Figure 5B:
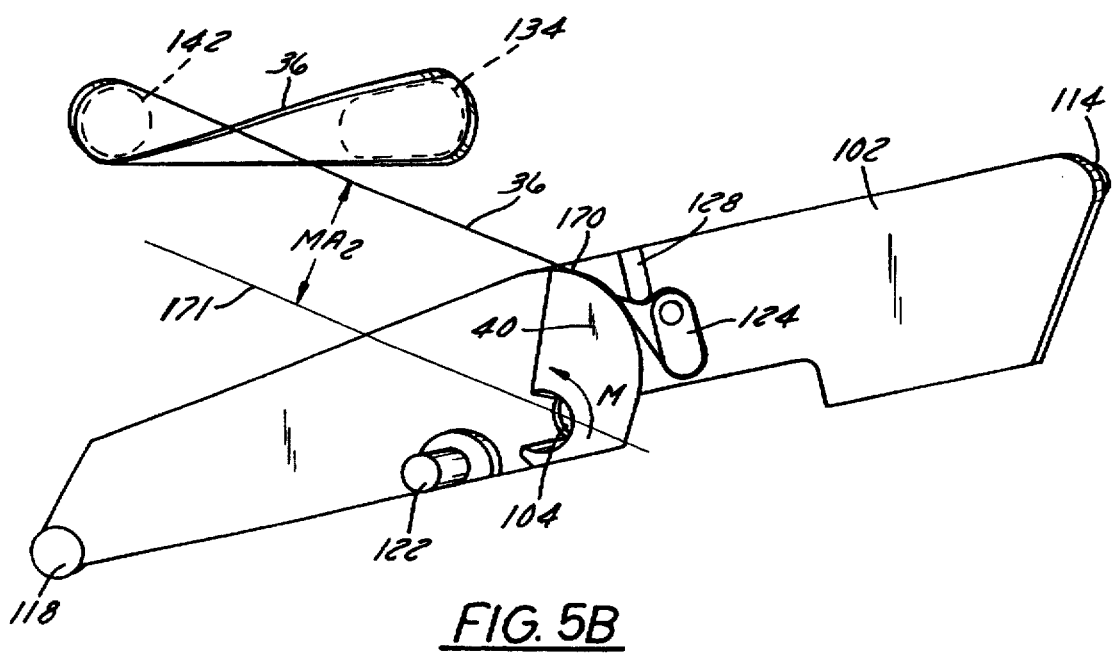
FIG. 5B is an enlarged side view of the link of FIG. 5A illustrating the position of the flexible member relative to the cam shaped pulley and pivot point when the link and suspension are in a collapsed position.

As is shown in FIGS. 5A & 5B, the flexible member 36 is urged against the cam-shaped pulley 40 by a finger 128 that can help to keep any loops, straps, cables, or strands of the flexible member 36 together while also helping to prevent relative motion between the flexible member 36 and mounting peg 124 during travel of the suspension 32. Alternatively, finger 128 may not be required to urge the flexible member 36 against the cam-shaped pulley 40 if mounting peg 124 is positioned relative to the pulley 40 such that contact between the flexible member 36 and pulley 40 is always maintained. For example, if the mounting peg 124 is located adjacent the pivot 104 of the scissors arm linkage 34, finger 128 may not be required. For example, in another preferred embodiment depicted in FIG. 6, peg 124 and finger 128 are not required because the flexible member 36 is secured to an outwardly extending mounting peg 174 that is located adjacent to or generally coaxial with the suspension pivot 104.

As is shown more clearly in FIG. 4, to facilitate assembly, the flexible member 36 preferably is an endless flexible member that has one end looped around the spring evener 134 and received in one of its retainer pockets 138 with the other end of the flexible member 36 looped around the mounting peg 124 on the inner scissors arm link 102. Although the flexible member 36 is preferably of endless construction, the flexible member 36 can also be a belt or single strap directly fastened, at one end, to an inner link 102 and, at its other end, to one or more of the springs 38 of the suspension 32. If the flexible member 36 is not of endless construction, it can be a strap having a loop at each end for attaching it to the spring evener 134 and scissors link 102.

Preferably, the flexible member 36 is a belt or strap that is preferably substantially inelastic for producing a flexible member 36 having a spring rate that is greater than about 2000 pounds/inch for minimizing the impact that each flexible member 36 has on the spring rate (and natural frequency) of the suspension 32. Preferably, each flexible member 36 has a spring rate that is at least about 6000 pounds/inch and is preferably at least about 7000 pounds/ inch, depending upon the stiffness of the material of the flexible member 36. Each flexible member 36 preferably can also be constructed such that its spring rate approaches infinity ($\infty$).

Additionally, by using a flexible member 36 that does not function as a spring and which does not appreciably stretch during operation of the suspension 32, it simplifies suspension design and analysis because each flexible member 36 also does not contribute a degree of freedom to the suspension system. As a result of being substantially inelastic and therefore not stretchable, each flexible member 36 thereby does not constitute a degree of freedom, making the equations used for design and analysis of the suspension 32 much simpler to manipulate and solve, thereby also making the characteristics and performance of the suspension 32 much easier to approximate, predict, and adjust during the design phase.

Preferably, each flexible member 36 is constructed of a material having a load carrying portion that is preferably constructed of a material containing aramid fiber. Preferably, the flexible member 36 is an aramid fiber laminate or Aramid composite such as one or more layers of Aramid fiber sandwiched between outer layers of neoprene or urethane for producing a strong and wear and fatigue resistant flexible member 36 that has good toughness for being able to withstand the severe shocks, jolts, and cyclical loading typically encountered by an off-road vehicle. If desired, the flexible member 36 can also be a belt or strap constructed, at least in part, of an aramid fiber, KEVLAR NOMEX, stainless steel, wire cable, a nylon, or another material that is flexible, for being able to be wrapped around pulleys 40 & 142, and yet inelastic for producing a spring rate that is relatively large for minimizing the amount it can stretch during operation.

If desired, if each flexible member 36 is constructed of a material having a relatively low spring rate, such as a few hundred pounds, for example, the suspension of this invention could be constructed without coil springs 38. Although, the suspension of this invention is depicted as having a pair of springs 38 and flexible members 36, if desired, it preferably can also be constructed having a single spring 38 operably connected to a single flexible member 36 that is secured to one of the links 102 with the flexible member being in operable communication with cam-shaped pulley 40.

Weight and Height Adjustment Assembly

The weight and height adjustment assembly 46 is shown in FIGS. 1 & 2 and is illustrated in more detail in FIG. 3. The weight and height adjustment assembly 46 enables the height of the seat 30 to be adjusted relative to the base 44 of the seat suspension 32 to accommodate seat occupants of different sizes. The weight and height adjustment assembly 46 also enables the suspension 32 to be tuned so that it provides an appropriate amount of support to a seat occupant and is preferably variably tunable to accommodate seat occupants of a wide variety of weights.

To preferably minimize the amount of height and weight adjustment that must be done for a given seat occupant for a seat suspension 32 of this invention, height adjustment is independent of weight adjustment and weight adjustment is independent of height adjustment. Also advantageously, changing the weight adjustment of the suspension 32 does not substantially change the force-deflection characteristics of the suspension 32, even if seat height is varied when the suspension 32 is set at a given weight adjustment setting.

Weight Adjustment

As is shown in FIG. 3, the weight and height adjustment assembly 46 has a weight adjust assembly 150 and a height adjust assembly 152. The weight adjust assembly 150 includes those components which are responsible for applying and selectively varying the tension applied by the springs 38 to the flexible members 36. As such, the weight adjust assembly 150 preferably includes those components which apply a preload to the springs 38 by (a) selectively tensioning the springs 38, if tension springs are used, or (b) selectively compressing the springs, if compression springs are used in a modified weight adjustment assembly. The amount of preload applied helps to determine the amount of resistance that the suspension 32 provides to a force or load applied to the suspension 32.

To enable the weight supporting characteristics of the suspension 32 to be selectively adjusted, the weight adjust assembly 150 includes a weight adjustment knob 154 that is affixed to the suspension anchor rod 132 for rotation in unison therewith. Preferably, the weight adjust assembly 150 also includes the spring hanger 130, spring evener 134, rod 132, and springs 38 for enabling the distance between the spring hanger 130 and spring evener 134 to be selectively varied as the weight adjustment knob 154 and rod 132 are rotated to control the amount of tension applied to each spring as the seat suspension preload. To enable the distance between the spring hangers 130 & 134 to be changed to change the amount of tension applied to the springs 38, the spring hanger 130 has a slot (FIGS. 2 & 3) for receiving a threaded nut 158, and the suspension anchor rod 132 has a stop 160 that bears against the spring evener 134 during operation to limit its travel.

In assembly, the threaded rod 132 is threaded through the nut 158 and extends through the bore in the spring evener 134. The nut 158 is preferably affixed to the spring hanger 130 such as preferably by welding. If desired, the nut 158 can be frictionally retained in the spring hanger slot or can be otherwise adhesively fastened to the spring hanger 130. The stop 160 is preferably positioned between the spring evener 134 and spring hanger 130 so that it bears against the spring evener 134 for preventing it from moving beyond the stop 160 in a direction toward the spring hanger 130. The stop 160 can preferably be a washer that is affixed to the rod 132 such as preferably by welding. If desired, the stop 160 could be a washer retained by a pin that extends through the rod 132, such as is depicted in FIG. 3. The stop 160 prevents the spring evener 134 from moving during weight adjustment, thereby preventing weight adjustment from changing seat height.

As the weight adjustment knob 154 is rotated in one direction, the stop 160 bears against the spring evener 134 while the suspension anchor rod 132 rotates, causing the nut 158 to travel toward the front of the seat platform 42, spreading the spring hanger 130 apart from the spring evener 134 thereby stretching and tensioning the springs 38. Of course, when the knob 154 is rotated in the opposite direction, the spring hanger 130 moves toward the spring evener 134 reducing the amount of tension and stretch in the springs 38 thereby reducing the amount of preload applied to the suspension 32. When the desired amount of preload has been applied to the suspension 32 using the weight adjust assembly 150, the knob 154 is released and the weight setting preferably remains fixed until the knob 154 is again rotated.

Advantageously, as a result of the construction and arrangement of the weight adjust assembly 150, weight adjustment is independent of seat height adjustment because tensioning of the springs 38 is done by varying the distance between the spring hanger 130 and spring evener 134, and does not involve moving the spring evener 134 and flexible members 36. Since the spring evener 134 and flexible members 36 preferably do not move during weight adjustment, the height of the seat 30 relative to the base 44 of the seat suspension 32 of this invention preferably does not change during weight adjustment, making weight adjustment independent of height adjustment.

Height Adjustment

The height adjust assembly 152 includes those components of the seat suspension 32 which collectively move the springs 38 and spring hangers 130 & 134 toward or away from the front of the seat platform 42 to respectively expand or collapse the scissors linkage arrangement 34, thereby increasing or decreasing the distance the seat platform 42 is located from the base 44. Of course, as the distance between the seat platform 42 and base 44 is varied, the distance between the seat 30 and base 44 also correspondingly varies, enabling the height of the seat 30 relative to the base 44 to be selectively adjusted.

To enable the height of the seat 30 to be selectively adjusted, the height adjust assembly 152 includes a height adjustment knob 82 at one end of a screw 166 (FIG. 3) that is threaded into the nut 80 received and retained in the opening 76 in the suspension mounting bracket 68 that is affixed to the mounting platform 42. In addition to the height adjustment knob 82, the components of the height adjust assembly 152 include the spring hangers 130 & 134, springs 38, flexible members 36 and the scissors arm linkage 34.

The screw portion 166 of the height adjustment knob 82 is hollow for telescopingly, coaxially receiving the suspension anchor rod 132 therethrough. To prevent the rod 132 from being drawn completely through the height adjustment knob 82, the weight adjustment knob 154 is preferably larger than the opening through the height adjustment knob 82 for preferably causing the weight adjustment knob 154 to bear and stop against the height adjustment knob 82 and also to prevent rotation of the knob when released.

As the height adjustment knob 82 is rotated such that it is screwed into the threaded nut 80 in the seat platform 42, the springs 38 and spring hangers 130 & 134 collectively move toward the rear of the seat platform 42 causing the scissors arm linkage 34 to controllably collapse, thereby reducing the height of the seat 30 relative to the base 44. As the height adjustment knob 82 is screwed out of the seat platform 42, the springs 38 and spring hangers 130 & 134 move toward the front of the seat platform 42 causing the scissors arm linkage 34 to expand, raising the height of the seat 30. As seat height is being adjusted, the flexible members 36 also move in unison with the spring evener 134, transmitting force to both the cam-shaped pulley 40 and mounting peg 124 of each inner link 102, causing the inner links 102 to rotate about pivot points 104 making the scissors arm linkage 34 expand or collapse, depending upon the direction of movement of the flexible members 36. Since the preload applied to the suspension 32 does not substantially change during height adjustment, height adjustment is advantageously accomplished independently of weight adjustment.

Cam-Shaped Pulley and Load-Deflection (Force-Deflection) Characteristics of the Seat Suspension Referring to FIGS. 3, 5A, & 5B the flexible member 36 has an end looped around the mounting peg 124 of the inner link 102 of the scissors arm linkage 34, with the flexible member 36 bearing against the cam-shaped pulley 40. To prevent the scissors arm linkage 34 from collapsing, the mounting peg 124 and outer peripheral surface 170 of the cam-shaped pulley 40 are constructed and arranged such that they are spaced a distance from the pivot 104 of the linkage 34, creating a moment arm, $MA$, about the pivot 104 that produces a moment, $M$, during suspension operation tending to resist collapse of the linkage 34 and suspension 32. Preferably, the shape or profile of the cam-shaped pulley 40 results in a moment, $M$, about the pivot 104 that varies at different stages of collapse of the linkage 34 that results in the suspension 32 having desirable and preferably substantially linear load-deflection or force-deflection characteristics. Preferably, a suspension 32 of this invention is constructed and arranged to have substantially linear load-deflection or force-deflection characteristics at nearly all points of suspension collapse between its full up stroke and full down stroke positions (see FIGS. 7–12). Although a suspension 32 of this invention is constructed and arranged to have substantially linear load-deflection or force-deflection characteristics, a suspension 32 of this invention can have non-linear load-deflection or force-deflection characteristics as suspension travel approaches and reaches the full up stroke and full down stroke positions.

As is shown in FIG. 5A, there is a moment arm, $MA_1$, about the pivot 104 where the flexible member 36 bears against the outer periphery 170 of the cam-shaped pulley 40. When a load is applied to the suspension 32, such as from the weight of a person sitting in the seat 30 or from bumps or jolts during vehicle operation, a force opposing the load is transmitted along each flexible member 36 and the springs 38 of the suspension 32. Additionally, the direction of force received and transmitted by the flexible member 36 is about the cam-shaped pulley 40. Since the force transmitted by the flexible members 36 is at a distance from the pivot 104 of the scissors linkage 34, it creates a moment, $M$, about the pivot 104 tending to resist collapse of the suspension 32 and scissors linkage 34. The moment, $M$, about the pivot 104 created by the flexible members 36 interacting with the inner links 102 of the scissors linkage 34 preferably tends to resist suspension collapse, at least in part, by opposing moments created by the applied seat suspension load as a result of the rollers 112 & 120 on the scissor linkage axles 110 & 114 contacting the guideways 54 & 88 they are riding in during operation.

As is represented by that shown in FIG. 5B, the moment arm, $MA_2$, about the cam-shaped pulley 40 preferably increases as the scissors linkage 34 collapses or deflects during operation preferably as a result of the shape or profile of the outer peripheral surface 170 of the cam-shaped pulley 40 and the change in the point in where the flexible member 36 departs or separates from the cam-shaped pulley 40. Preferably, the length or magnitude of the moment arm, MA, about the pivot 104 increases as the suspension 32 and linkage 34 deflect or collapse to counteract the increasing moment arms about the pivot 104 resulting from the rollers 112 & 120 contacting the guideways 54 & 88 increasingly further outwardly of the pivot 104. For a given and constant deflection or an increasing force applied to the suspension 32, the moment arm about the pivot 104, as a result of the rollers 112 & 120 contacting the guideways 54 & 88, increases as the linkage 34 collapses because the rollers 112 & 120 contact the guideways 54 & 88 at a point horizontally of the pivot 104 that is increasingly farther away from the pivot 104.

Figure 7:
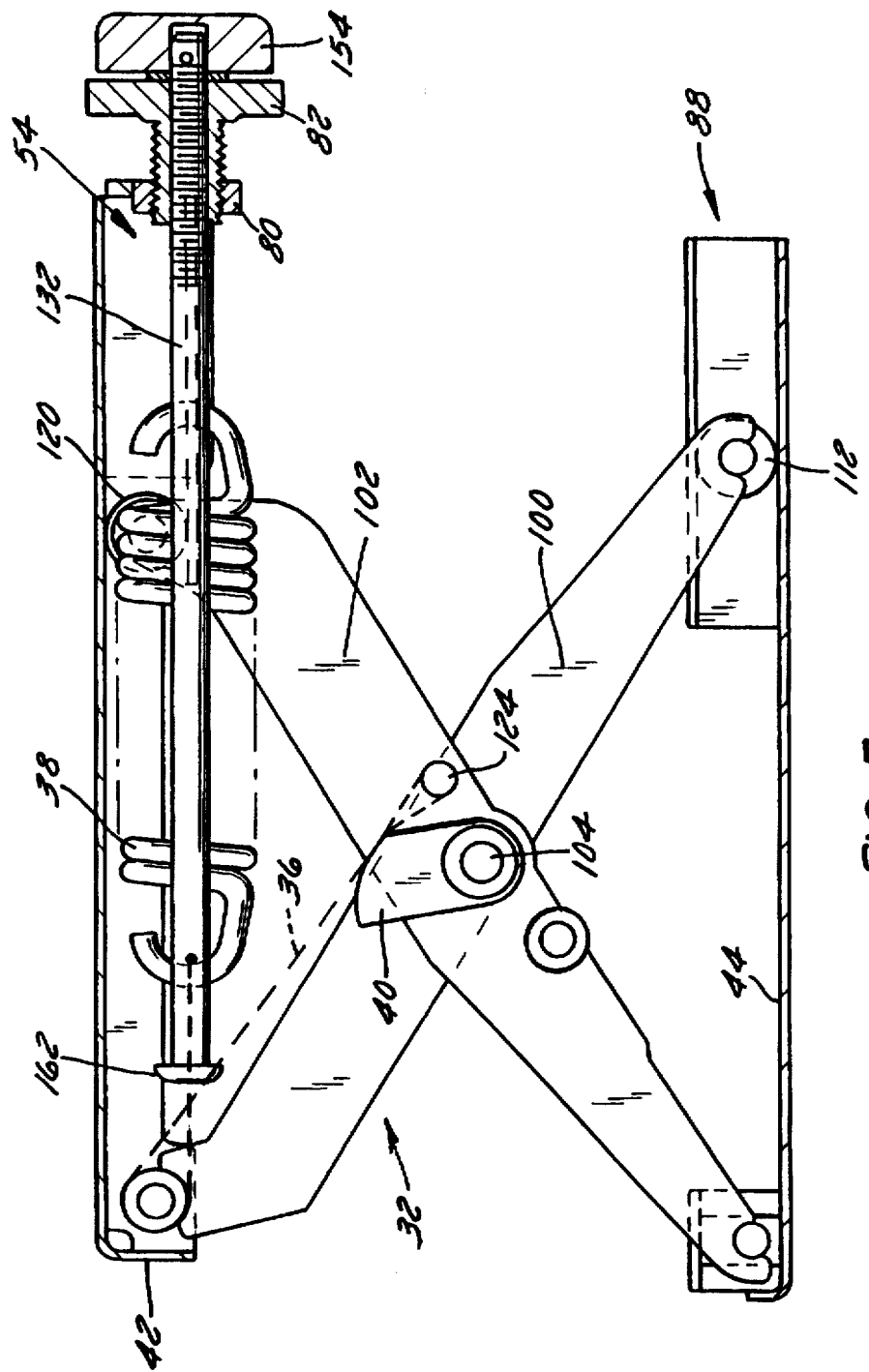
FIG. 7 is a sectional elevation view of the vehicle seat suspension illustrating the seat platform near or at its full up stroke position with the height adjust of the suspension set at its highest setting.

Initially, when the amount of suspension deflection is very small (such as is depicted in FIGS. 7 or 8) the moment arm about the pivot 104 created by the cam-shaped pulley 40 is represented in FIG. 5A as $MA_1$. As the suspension 32 deflects, as is depicted in FIG. 5B, the point of separation of the flexible member 36 from the cam-shaped pulley 40 moves counterclockwise increasing the length of the moment arm about the pivot 104 from $MA_1$ to $MA_2$. Preferably, the moment arms $MA_1$ & $MA_2$ are determined by taking the distance between an imaginary line 171 that extends in a direction parallel to the flexible member 36 and through an axis of the pivot 104 that preferably is its center. For the other link 102 of the suspension 32 that is not shown in FIGS. 5A & 5B, the point of separation would move clockwise from the point of an observer within the suspension facing the cam-shaped pulley 40 carried by that link 102.

Preferably, this moment arm, MA, created by the cam-shaped pulley 40 interacting with the flexible member 36, increases as the moment arm resulting from the rollers 112 & 120 contacting the guideways 54 & 88 also increases during suspension collapse. As a result, the resistance to deflection of the suspension 32 and collapse of the linkage 34 increases relative to the amount of force tending to deflect the suspension 32 and collapse the linkage 34. Preferably, the construction and arrangement of the flexible member 36 and cam-shaped pulley 40 on the linkage arms causes the resistance to deflection of the suspension 32 to increase proportionally to the amount of force tending to deflect the suspension 32 and collapse the linkage 34. Preferably, the resistance to deflection of the suspension 32 as a result of the moment arm, MA, created by the construction and arrangement of the flexible member 36 and cam-shaped pulley 40 helps to produce a suspension 32 of this invention having substantially linear force-deflection or load-deflection characteristics.

Therefore, as the suspension 32 deflects, it collapses and the point of separation (or the point initial contact) of the flexible member 36 with the cam-shaped pulley 40 changes, increasing the length of the moment arm, MA, and resultant moment, M, thereby increasingly resisting collapse as the suspension 32 further deflects. As such, the outer profile of the pulley 40 determines the length of the moment arm, MA, about the pivot 104 at any point of deflection or collapse of the suspension 32. Additionally, the location of the cam-shaped pulley 40 relative to the pivot 104 of the scissors linkage determines the force-deflection characteristics of the suspension. Therefore, as the applied load increases, the moment, M, tending to resist deflection of the linkage 34 increases not only because the load applied to the suspension 32 has increased (due to extension of the springs 38), but also because the length of the moment arm, MA, has increased as a result of deflection of the suspension 32 rotating the cam-shaped pulley 40 about the center of the pivot 104. Preferably, to produce a suspension 32 having load-deflection characteristics that are substantially linear, the profile 170 of the cam-shaped pulley 40 is preferably substantially elliptical and preferably can encompass about one quadrant (or more, if desired) of contact surface with the flexible member 36 during operation. Preferably, the construction and arrangement of the cam-shaped pulley 40 along with its profile also advantageously help to produce a suspension construction having force-deflection (load-deflection) characteristics which can enable weight adjustment to be performed without substantially changing the force-deflection characteristics of the suspension 32.

To vary the load-deflection (force-deflection) characteristics of a suspension 32 of this invention, such as for changing the operating (load-deflection/force-deflection) characteristics of the suspension 32, preferably, the profile shape 170 of the cam-shaped pulley 40 can be varied or its distance from the pivot 104 altered. By changing the profile 170 of the pulley 40, it changes how the length of the moment arm, MA, about the pivot 104 changes during suspension collapse, thereby controlling how the suspension 32 resists collapse. In this manner, the load-deflection characteristics of the suspension 32 can be tailored or programmed by altering the pulley profile 170 to impart certain desired load-deflection characteristics to the suspension 32. For example, different cam-shaped pulley profiles can be used to impart different load-deflection characteristics to suspensions of this invention used for different seating applications.

Second Preferred Flexible Member Mounting Arrangement

Figure 6:
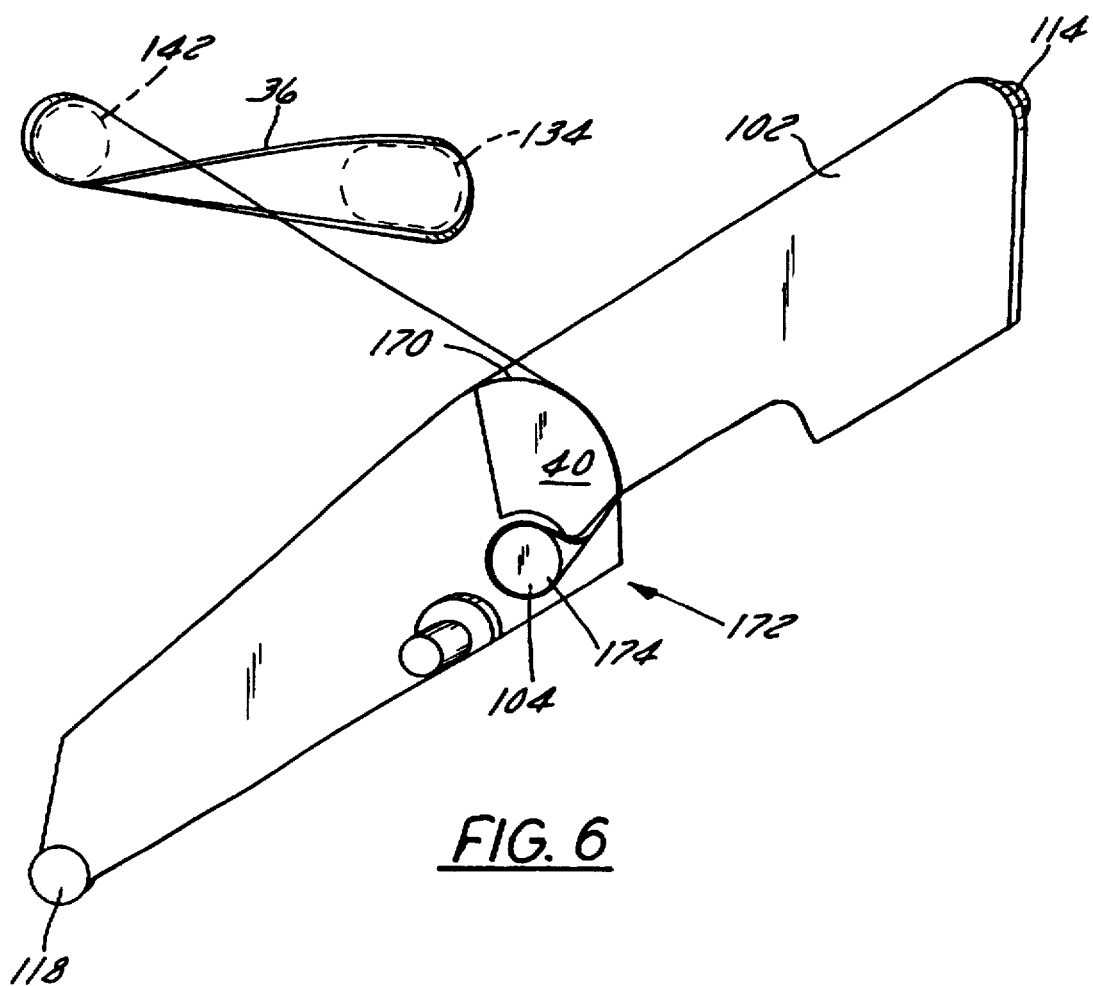
FIG. 6 is an enlarged side view of a second preferred flexible member mounting arrangement for mounting the flexible member to the scissors link so it is in contact with the cam-shaped pulley during suspension operation.

FIG. 6 illustrates a second preferred mounting arrangement 172 for mounting a flexible member 36 to scissors link 102 adjacent the cam-shaped pulley 40 such that the flexible member 36 maintains contact with the cam-shaped pulley 40 during suspension operation without requiring any finger or peg to urge the flexible member 36 against the cam-shaped pulley 40. To mount the flexible member 36 to the link 102, a loop of the flexible member 36 is received around a mounting peg 174 that extends outwardly from the link 102 and which preferably is adjacent to the pivot 104 of the scissors linkage arrangement 34. Preferably, the flexible member mounting peg 174 generally overlies the pivot 104 and can be constructed and arranged so as to be coaxial with the pivot 104, if desired. Preferably, operation and interaction of the flexible member 36 with the cam-shaped pulley 40 to produce a moment, M, about the pivot 104 that tends to resist collapse of the suspension 34 is as previously discussed. Preferably, changes in moment arm length, MA, are independent of how the flexible member 36 is secured to scissors link 102 in FIG. 6.

Use and Operation

In use, the vehicle seat suspension 32 of this invention is preferably used for vehicle seating in off-road vehicles, such as farm tractors, heavy equipment, large trucks, and the like. Additionally, the seat suspension of this invention is also particularly well suited for small tractors, turfcare equipment, or another similar vehicle requiring a seat suspension. Additionally, such a suspension 32 can also be adapted for use in automotive vehicles, if desired.

In operation of the weight adjust assembly 150 of a seat and suspension of this invention, the weight adjustment knob 154 is rotated by a seat occupant until the suspension 32 provides the desired amount of support for the occupant. As the knob 154 is turned, the suspension anchor rod 132 is rotated, pulling the spring hanger 130 toward the front of the seat platform 42, spreading the springs 38 and preloading the suspension 32 by applying tension to the springs 38. Alternatively, the knob 154 can be rotated in the opposite direction to reduce preload and tension on each spring 38. After adjustment, an occupant of the seat 30 may sit on the seat 30 to determine if they perceive they are properly supported on the seat 30 by the suspension 32. If desired, further adjustment of the weight adjust assembly 150 can be performed until the seat occupant has selected a desired amount of preload that provides the desired amount of support to the seat occupant.

In operation of the height adjust assembly 152, the seat occupant rotates the height adjustment knob 82 until the desired seat height is set. As the height adjustment knob 82 is rotated, it moves the spring hangers 130 & 134, springs 38 and flexible members 36, all preferably in unison, causing the suspension 32 to controllably expand or collapse depending upon the direction of rotation of the knob 82, thereby enabling the height of the seat 30 to be selectively set relative to the base 44.

Figure 12:
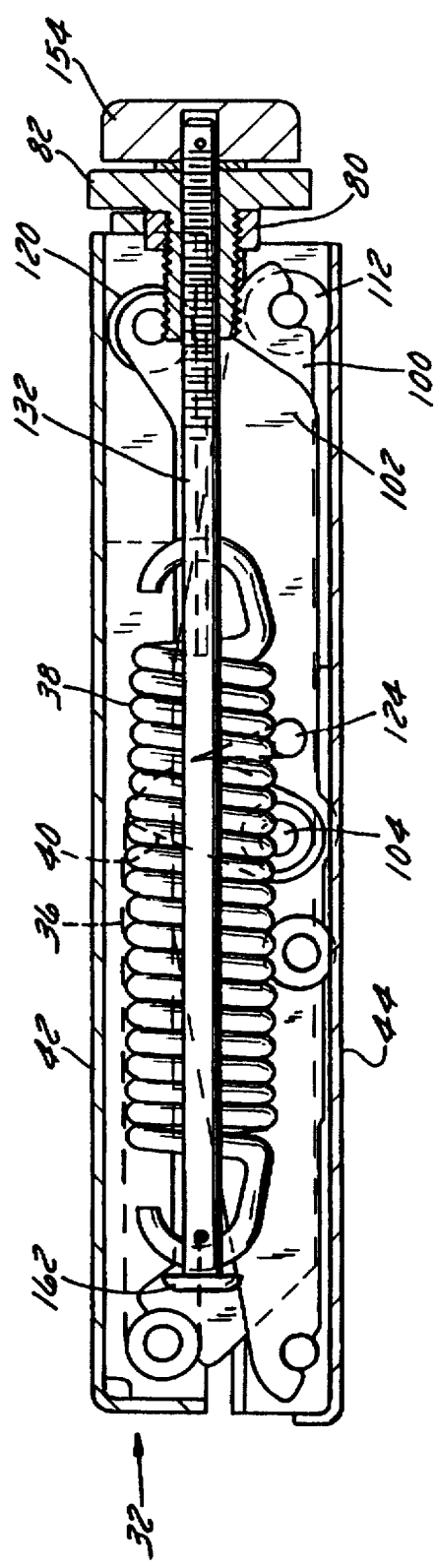
FIG. 12 is a sectional elevation view of the vehicle seat suspension illustrating the seat platform near or at its full down stroke position with the height adjust of the suspension set at its lowest setting.

FIGS. 7–9 illustrate the seat suspension 32 with its height adjusted to its highest height position. FIGS. 10–12 illustrate the seat suspension 32 of this invention with its height adjusted to its lowest position. In this manner, a seat suspension 32 of this invention can accommodate seat occupants of a variety of sizes and weights.

In operation of the suspension 32, with a person sitting in the seat 30, force from the weight of the person sitting on the seat 30 is transmitted along the springs 38 and flexible members 36 to the cam-shaped pulleys 40 and mounting pegs 124 of the inner links 102 of the scissors linkage 34 allowing the suspension 32 to controllably deflect while preventing collapse of the scissors linkage 34. Preferably, in addition to the moment, M, created by each flexible member 36 operably cooperating with its corresponding cam-shaped pulley 40 helping to resist suspension collapse, the tension of the springs 38 acting upon the flexible members 36 also help to resist suspension collapse. As bumps and jolts are encountered by the suspension 32, the suspension 32 deflects causing force transmitted by each flexible member 36 to and about its corresponding cam-shaped pulley 40 to create a moment about the pivot 104 of its scissors link 102 which opposes the moments created about the pivot 104 as a result of force on the scissors linkage 34 due to the rollers 112 & 120 of the linkage arrangement 34 contacting the guideways 54 & 88. These opposing moments allow the suspension 32 to controllably deflect and the linkage arrangement 34 to controllably collapse in a preferably substantially linear fashion relative to the magnitude of the load applied to the suspension 32. The amplitude of these same bumps and jolts are preferably absorbed and reduced by the springs 38, as their force is transmitted to the springs 38 preferably by the flexible members 36. If a dampener 48 is present, the dampener 48 also preferably absorbs and reduces their amplitude, particularly as the force is initially transmitted to the suspension 32.

Travel of the suspension 32 in response to a load is more clearly illustrated in FIGS. 7–9, with its seat 30 set at its highest position, and again in FIGS. 10–12, depicting operation of the suspension 32 with its seat 30 set in its lowest position. As is depicted in FIG. 7 & 10, the seat platform 42 is shown in its full up stroke position with no load being applied to the seat or its suspension 32. When a load is applied to the suspension 32, the seat platform 42 deflects downwardly, as is illustrated in FIGS. 8 & 11, toward its full down stroke position causing the links 100 & 102 to collapse, extending the axle ends of each link 100 & 102 outwardly toward the front of the seat platform 42 and suspension base 44. As the axle ends of each link 100 & 102 extends outwardly, each axle rides on rollers 112 & 120 in its corresponding guideway 54 & 88 providing smooth motion to the collapsing suspension 32. If the load is sufficiently large enough, it can cause the suspension 32 to reach its fully collapsed, full down stroke position, as is shown in FIGS. 9 & 12. When in its full down stroke position, the spring evener 134 preferably bears against the bumper 164 adjacent the downstop 162 on the suspension anchor rod 132.

It is also to be understood that, although the foregoing description and drawings describe and illustrate in detail a working embodiment of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A suspension for a seat comprising:
 (a) a base acting as a support for the suspension;
 (b) a platform underlying and carrying the seat;
 (c) a scissors linkage in operable communication with said base and said platform spacing said platform a distance from said base;
 (d) an elongate inelastic flexible member operably connected to said scissors linkage;
 (e) a spring operably connecting said inelastic flexible member to one of said base and said seat platform; and
 (f) a cam-shaped pulley carried by said scissors linkage having an elliptical outer profile against which said flexible inelastic member bears for opposing a decrease in said distance between said platform and said base.

2. The seat suspension of claim 1 wherein 1) said scissors linkage comprises a pair of links between said platform and said base that are pivotally connected to each other, 2) said elliptical cam-shaped pulley is fixed to one of said links of said scissors linkage, and 3) said flexible inelastic member is wrapped around a portion of said elliptical cam-shaped pulley.

3. The seat suspension of claim 2 wherein said flexible member comprises a flexible inelastic belt.

4. The seat suspension of claim 3 wherein said belt is comprised of a laminate having a layer of an aramid material disposed between a first layer of neoprene and a second layer of neoprene.

5. The seat suspension of claim 3 further comprising a dampener in operable communication with said scissors linkage and one of said base and said seat platform.

6. The seat suspension of claim 3 wherein said belt is comprised of cable.

7. The seat suspension of claim 2 wherein said inelastic flexible member has a spring rate that is greater than two thousand pounds per inch.

8. The seat suspension of claim 1 wherein said spring is a coil spring attached at one end to said inelastic flexible member and operably connected at its other end to said platform.

9. The seat suspension of claim 8 further comprising a rod 1) threadably coupled to one end of said spring, 2) in operable cooperation with the other end of said spring, and 3) operably connected to said platform such that i) rotation of said rod in one direction urges said ends of said spring further apart stretching said spring increasing resistance to said platform moving toward said base in response to a load applied to said platform or said base and ii) rotation of said rod in the other direction permits said ends of said spring to move closer together decreasing resistance to said platform moving toward said base in response to a load applied to said platform or said base.

10. The seat suspension of claim 9 wherein said seat platform has a front and a rear and further comprising means for moving said spring toward said front or said rear of said platform without changing the distance between said ends of said spring for increasing or decreasing the distance between said platform and said base.

11. The seat suspension of claim 10 wherein said spring moving means comprising a screw threadably coupled to said front of said platform and in operable cooperation with said rod for axially displacing said rod and said spring toward said front of said platform when said screw is rotated in one direction increasing the distance between said platform and said base and axially displacing said rod and said spring toward said rear of said platform when said screw is rotated in an opposite direction decreasing the distance between said platform and said base.

12. A suspension for a vehicle seat comprising:
(a) a base for mounting the suspension to a vehicle;
(b) a platform carrying the seat;
(c) a linkage assembly 1) disposed between said base and said platform, 2) spacing said platform a distance from said base, and 3) permitting variation of the spacing between said platform and said base;
(d) a spring which is in operable communication with one of said base and said platform and which is in operable communication with said linkage assembly, said spring opposing collapse of said suspension, wherein said spring has a preload with a designated tension when no external load is imposed on said seat;
(e) a height adjust mechanism which is in operable communication with said base and said platform and which is constructed and arranged to selectively vary an unloaded spacing which exists between said platform and said base by moving said spring relative to said platform and said base without changing said preload of said spring; and
(f) a weight adjust mechanism which is in operable communication with said base and said platform and which is constructed and arranged to selectively adjust said preload of said spring and hence to control the amount of resistance that the suspension offers to a force applied to the suspension upon the imposition of an external load on said seat; and
(g) wherein said weight adjust mechanism is operated to selectively control the amount of resistance that the suspension offers to a force applied to the suspension independently of operation of said height adjust mechanism and without changing said unloaded spacing between said platform and said base, and wherein said height adjust mechanism is operated independently of said weight adjust mechanism to adjust said unloaded spacing without changing said preload of said spring and hence without changing the amount of resistance that the suspension offers to a force applied to the suspension upon the imposition of an external load on said seat.

13. The vehicle seat suspension of claim 12 wherein (a) said spring is carried by one of said base and said platform, has one end operably connected to a first spring hanger, and has another end operably connected to a second spring hanger such that said spring hangers are spaced apart by said spring, and further comprising a flexible member operably connected to one of said spring hangers and said spring and operably connected to said linkage assembly, wherein said height adjust mechanism moves both said spring hangers in unison relative to said base and said seat platform moving said spring and said flexible member in unison with said spring hangers to selectively adjust said unloaded spacing between said seat platform and said base; and wherein (b) said weight adjust mechanism moves one of said spring hangers relative to the other of said spring hangers for stretching or compressing said spring to adjust said preload of said spring for varying resistance to force applied to the vehicle seat suspension.

14. The vehicle seat suspension of claim 13, wherein 1) said weight adjust mechanism comprises a rod in operable communication with both said spring hangers, said rod constructed and arranged such that rotation of said rod selectively varies the distance between said spring hangers which stretches or compresses said spring thereby adjusting said preload of said spring, and 2) wherein said height adjust mechanism is constructed and arranged to move said rod, said spring hangers and said spring in unison relative to said platform and without relative movement between said spring hangers to displace said spring and flexible member, to vary said unloaded spacing between said vehicle seat platform and said base, and to vary the unloaded height of the seat relative to said base.

15. The suspension of claim 14 further comprising an inelastic flexible member operably connected to one of said spring hangers and operably connected to said linkage assembly.

16. The suspension of claim 15 further comprising a cable-engaging pulley which is mounted to said linkage assembly and against which a portion of said flexible inelastic member bears.

17. A suspension for a vehicle seat comprising:
(a) a base for mounting the suspension to a vehicle;
(b) a platform carrying the seat;
(c) a scissors linkage in operable communication with said base and said platform for enabling said platform to move relative to said base, said scissors linkage having a first link connected by a pivot to a second link with said first and second links both in operable communication with said base and said platform; and
(d) a cam carried by one of said links and having an outer peripheral surface defining a profile and said outer peripheral surface being offset from said pivot;
(e) a flexible member in operable communication with one of said base and said seat platform and in operable communication with one of said links with said flexible member bearing against said outer peripheral surface of said cam such that the point of contact of said flexible member with said cam is disposed from said pivot for creating a moment about said pivot tending to resist collapse of said linkage in response to force applied to the suspension.

18. The suspension of claim 17 wherein said profile of said cam is generally elliptical and said cam is constructed and arranged such that said profile increases the distance from said pivot where said flexible belt separates from said cam as the linkage collapses for increasing a magnitude of said moment thereby increasing resistance to collapse of the linkage.

19. The suspension of claim 17 wherein said profile of said cam is generally elliptical.

20. The suspension of claim 17 wherein said flexible member is comprised of cable and has a spring rate greater than two thousand pounds per inch.

21. The suspension of claim 17 wherein said flexible member comprises a belt connected to said scissors linkage and further comprising a coil spring connected to said belt and connected to said platform.

22. A suspension for a vehicle seat comprising:
(a) a base for mounting the suspension to a vehicle;
(b) a platform carrying the seat and spaced a distance from said base;
(c) a scissors linkage for enabling said seat platform to be moved relative to said base;
(d) a spring which is in operable communication with one of said base and said platform and which is preloaded with a designated tension to resist collapse of said scissors linkage and movement of said platform relative to said base upon imposition of an external load on said seat;
(e) a flexible member which is in operable communication with said scissors linkage and said spring; and
(f) a height adjust mechanism for varying said distance of said platform from said base, said height adjust mechanism being constructed and arranged to move said spring and said flexible member in unison relative to said base and said platform, without altering the tension of said spring, to selectively collapse or expand said scissors linkage and to selectively alter said unloaded spacing between said platform and said base.

23. The seat suspension of claim 22, further comprising: a first spring hanger which is in operable communication with one of said platform and said base and which is in operable communication with said spring, a second spring hanger which is in operable communication with said spring and said flexible member, said height adjust mechanism being operable to move said spring hangers in unison to selectively move said spring and said flexible member in unison and thereby to selectively vary said unloaded spacing between said platform and said base.

24. A suspension for a vehicle seat comprising:
(a) a base for mounting the seat to a vehicle;
(b) a platform underlying and carrying the seat;
(c) a scissors linkage between said platform and said base;
(d) a spring operably connected to said platform and having a preload with a designated tension when no external force is imposed on said platform to cause the suspension to offer a resistance to a force applied to the suspension upon the imposition of an external load on said seat;
(e) a flexible inelastic member coupling said spring to said scissors linkage;
(f) a weight adjust mechanism for varying said preload on said spring thereby to vary the resistance of the suspension to a force applied to the suspension upon the imposition of an external load on said seat; and
(g) a height adjust mechanism for selectively varying said unloaded spacing between said platform and said base, wherein said height adjust mechanism is constructed and arranged to move said spring and said flexible member in unison relative to said platform, without altering the tension of said spring, to vary said unloaded spacing between said platform and said base.

25. The seat suspension of claim 24 wherein said weight adjust mechanism further comprises 1) a first spring hanger which is in operable communication with one of said base and said platform and in operable communication with said spring, and 2) a second spring hanger which is in operable communication with said spring and said flexible inelastic member and which is spaced a distance from said first spring hanger, and wherein said spring hangers are constructed and arranged such that one of said spring hangers is selectively movable relative to the other of said spring hangers to selectively vary the distance between said spring hangers to selectively alter the preload on said spring.

26. A vehicle seat suspension comprising:
(a) a base;
(b) a platform carrying a seat;
(c) a linkage assembly joining said base to said platform and permitting variation in the spacial relationship therebetween;
(d) a flexible inelastic member operably connected to said linkage assembly;
(e) a spring connecting said flexible inelastic member to one of said platform and base and having a preload of a designated tension to cause the suspension to offer a resistance to a force applied to the suspension upon the imposition of an external load on said seat;
(f) a height adjustment assembly constructed and arranged to move said spring and said flexible inelastic member in unison relative to both said platform and said base to increase or decrease an unloaded spacing that exists between said platform and said base in the absence of the imposition of an external load on said seat, wherein said height adjust mechanism alters said unloaded spacing without changing said preload of said spring; and
(g) a weight adjustment assembly constructed and arranged to adjust said preload of said spring to increase or decrease resistance to a load applied to said platform or said base without changing the spacial relationship therebetween.

27. The seat suspension of claim 26 further comprising a cam-shaped pulley carried by said linkage assembly, and wherein said flexible inelastic member bears against said cam-shaped pulley.

28. The seat suspension of claim 27 wherein said cam-shaped pulley has an elliptical outer profile against which at least a portion of said belt bears.

29. A vehicle seat suspension comprising:
(a) a base;
(b) a platform having a front and a rear and carrying a seat;
(c) a scissors linkage assembly joining said base to said platform and permitting variation in the spacial relationship therebetween;
(d) a spring operably connected to said scissors linkage assembly and operably connected one of said platform and base, said spring being preloaded with a designated tension to cause the suspension to offer a resistance to a force applied to the suspension upon the imposition of an external load on said seat;
(g) a height adjustment assembly carried by one of said base and said platform constructed and arranged to move said spring rearwardly or frontwardly relative to said platform and said base, without changing the tension of said spring, to increase or decrease an unloaded spacing which exists between said platform and said base when no external load is imposed on said seat; and (h) a weight adjustment assembly which is carried by one of said base and said platform and which is constructed and arranged to change the tension of said spring to increase or decrease resistance to a load applied to said platform or said base without changing the spacial relationship therebetween.

30. The seat suspension of claim 29 wherein said weight adjustment assembly comprises a rod 1) threadably coupled to said platform, 2) threadably coupled to one end of said spring, and 3) having a stop which bears against another end of said spring, wherein said weight adjustment assembly is constructed and arranged such that 1) rotation of said rod in one direction stretches said spring to increase the preload on said spring, thereby increasing resistance of said spring to a load applied to said platform or said base and 2) rotation of said rod in an opposite direction relaxes said spring to decrease the preload on said spring, thereby decreasing resistance of said spring to a load applied to said platform or said base.

31. The seat suspension of claim 29, wherein said height adjustment assembly comprises 1) an elongate rod in cooperation with both ends of said spring and operably connected to said platform and 2) means for moving said rod relative to said platform such that movement of said rod moves said spring in unison with said rod, wherein 1) movement of said rod in one direction expands said scissors linkage assembly thereby increasing the unloaded spacing between said platform and said base and 2) movement of said rod in an opposite direction collapses said scissors linkage assembly thereby decreasing the unloaded spacing between said platform and said base.

32. A vehicle seat suspension comprising:

(a) a base;

(b) a platform having a front and a rear and carrying a seat;

(c) a scissors linkage assembly joining said base to said platform and permitting variation in the spacial relationship therebetween, said scissors linkage assembly comprising a first pair of links pivotally connected by a pivot and a second pair of links pivotally connected by a pivot;

(d) a cam-shaped pulley fixed to one link of each pivotally connected pair and having an outer peripheral surface offset from said pivot of each pivotally connected pair;

(e) a first flexible member operably connected to said platform and one of said pairs of links having a portion of said flexible member bearing against said outer peripheral surface of one of said cam-shaped pulleys at a point along said outer peripheral surface disposed from said pivot for creating a moment about said pivot tending to resist collapse of said linkage assembly in response to a force applied to said platform or said base;

(f) a second flexible member operably connected to said platform and the other one of said pairs of links having a portion of said flexible member bearing against said outer peripheral surface of the other of said cam-shaped pulleys at a point along said outer peripheral surface disposed from said pivot for creating a moment about said pivot tending to resist collapse of said linkage assembly in response to a force applied to said platform or said base; and (g) at least one coil spring operably connecting said flexible members to said platform.

33. The seat suspension of claim 32 comprising a pair of springs in parallel operably connecting said flexible members to said platform.

34. The seat suspension of claim 32 wherein said outer peripheral surface of each said cam-shaped pulley has an elliptical profile for imparting to said suspension force-deflection characteristics that resist collapse of said linkage assembly in proportion to the magnitude of force applied to said suspension tending to collapse said linkage assembly.

* * * * *